Nov. 16, 1943.  W. G. PLUMB  2,334,645
FOUR-SQUARE SHEET TRIMMING MACHINE
Filed April 7, 1942  18 Sheets-Sheet 2
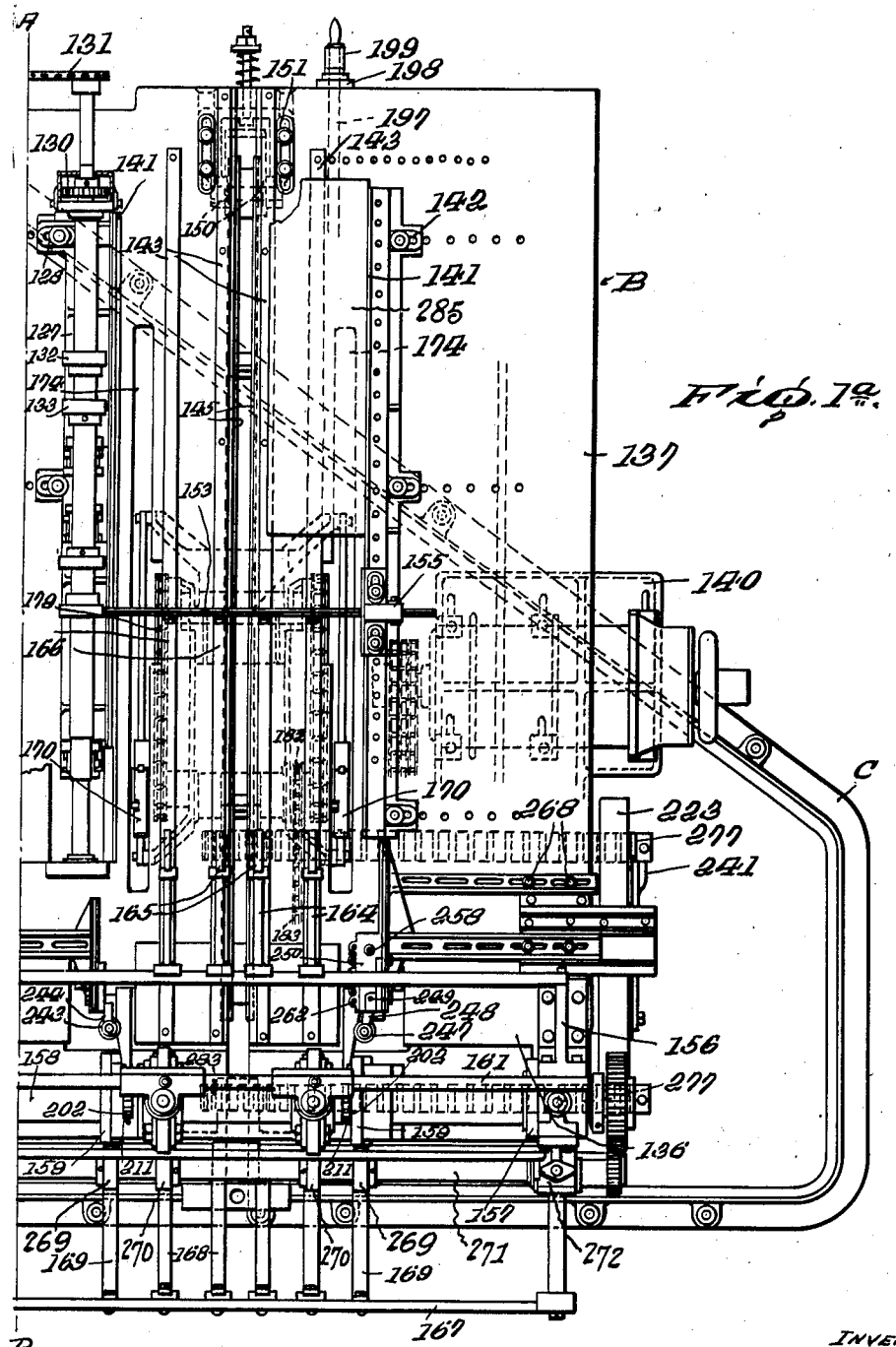
Fig. 1ª.
INVENTOR
Walter G. Plumb
By
Mason, Porter & Diller
ATTORNEYS

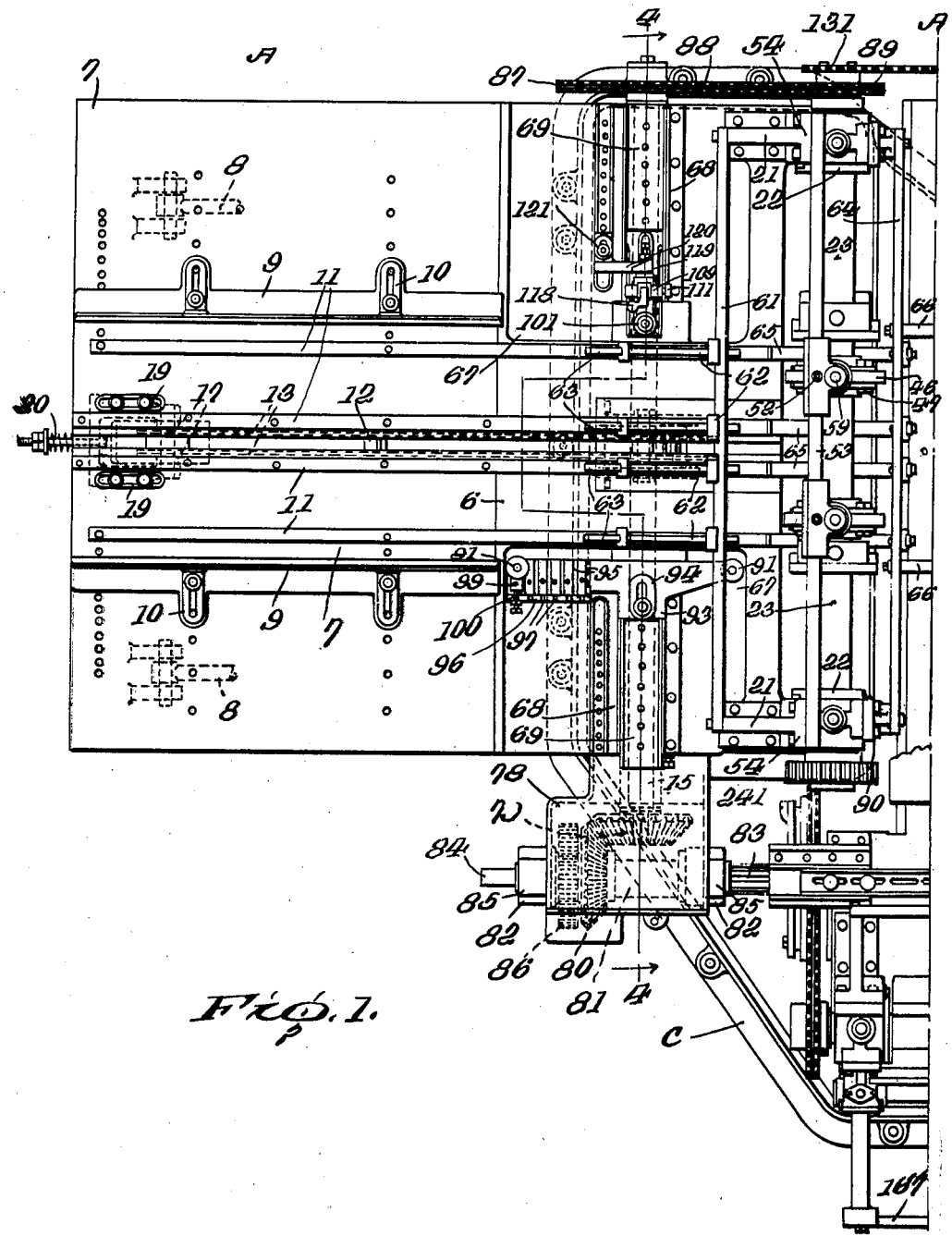

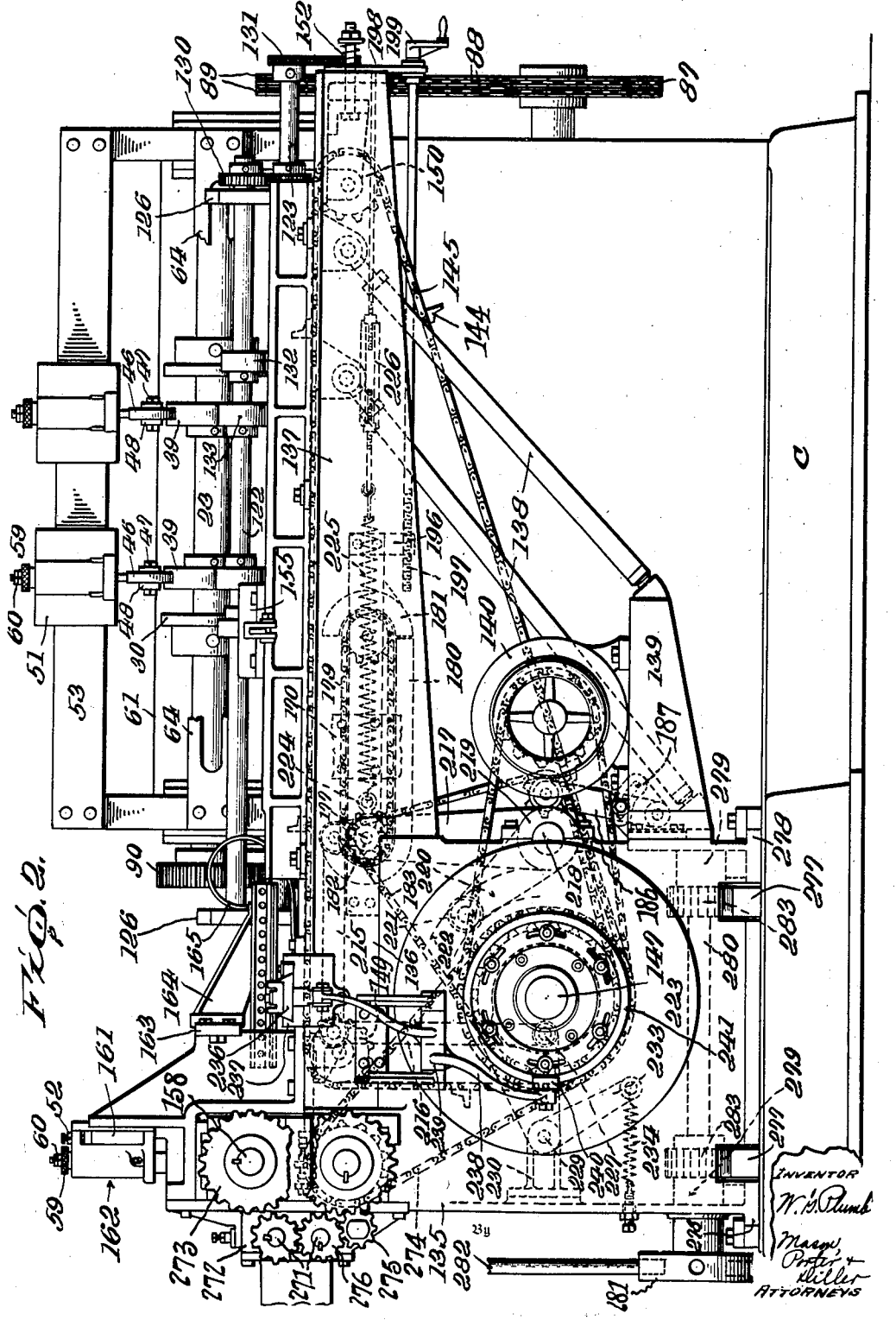

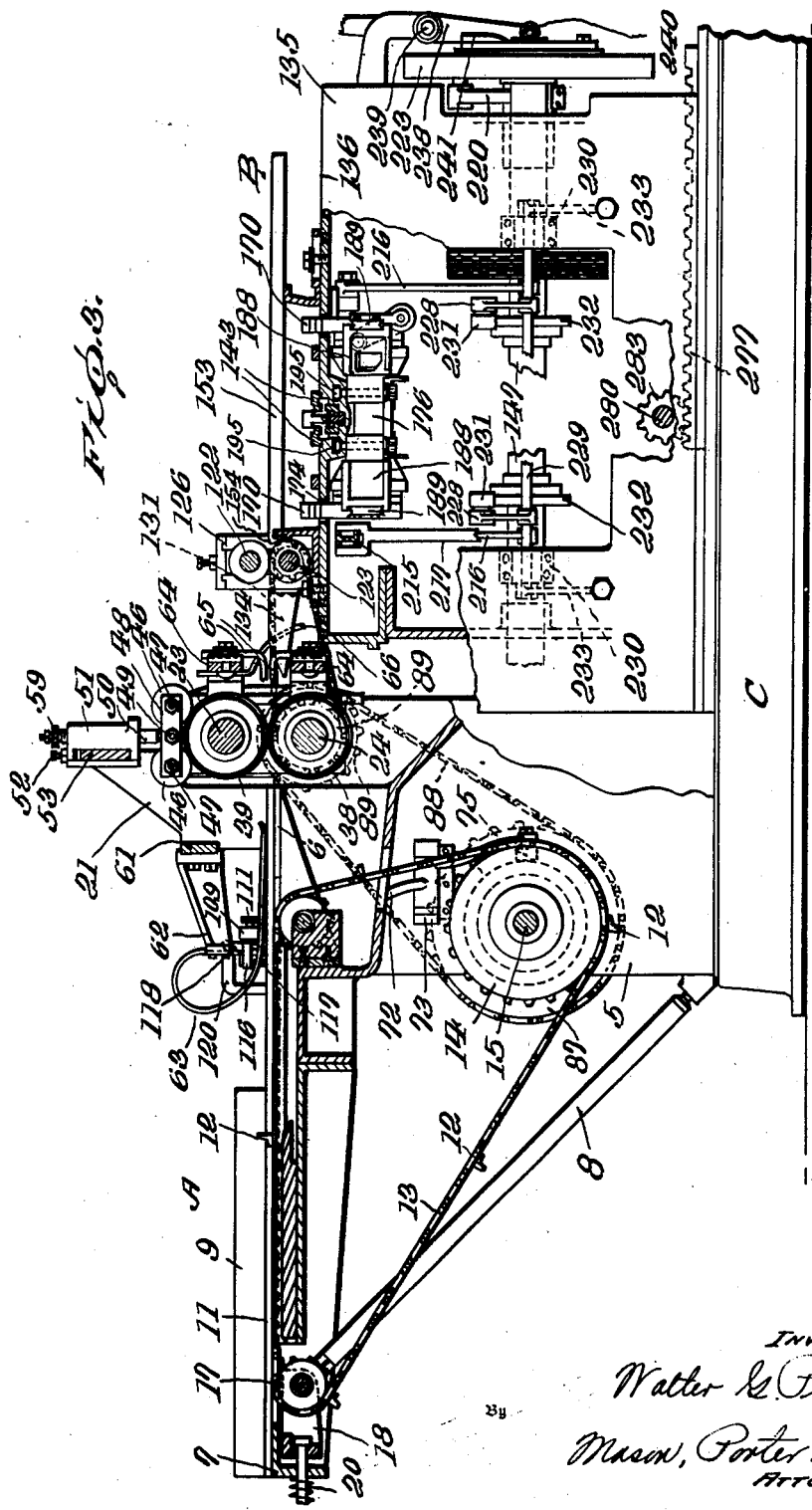

Nov. 16, 1943.  W. G. PLUMB  2,334,645
FOUR-SQUARE SHEET TRIMMING MACHINE
Filed April 7, 1942  18 Sheets-Sheet 5
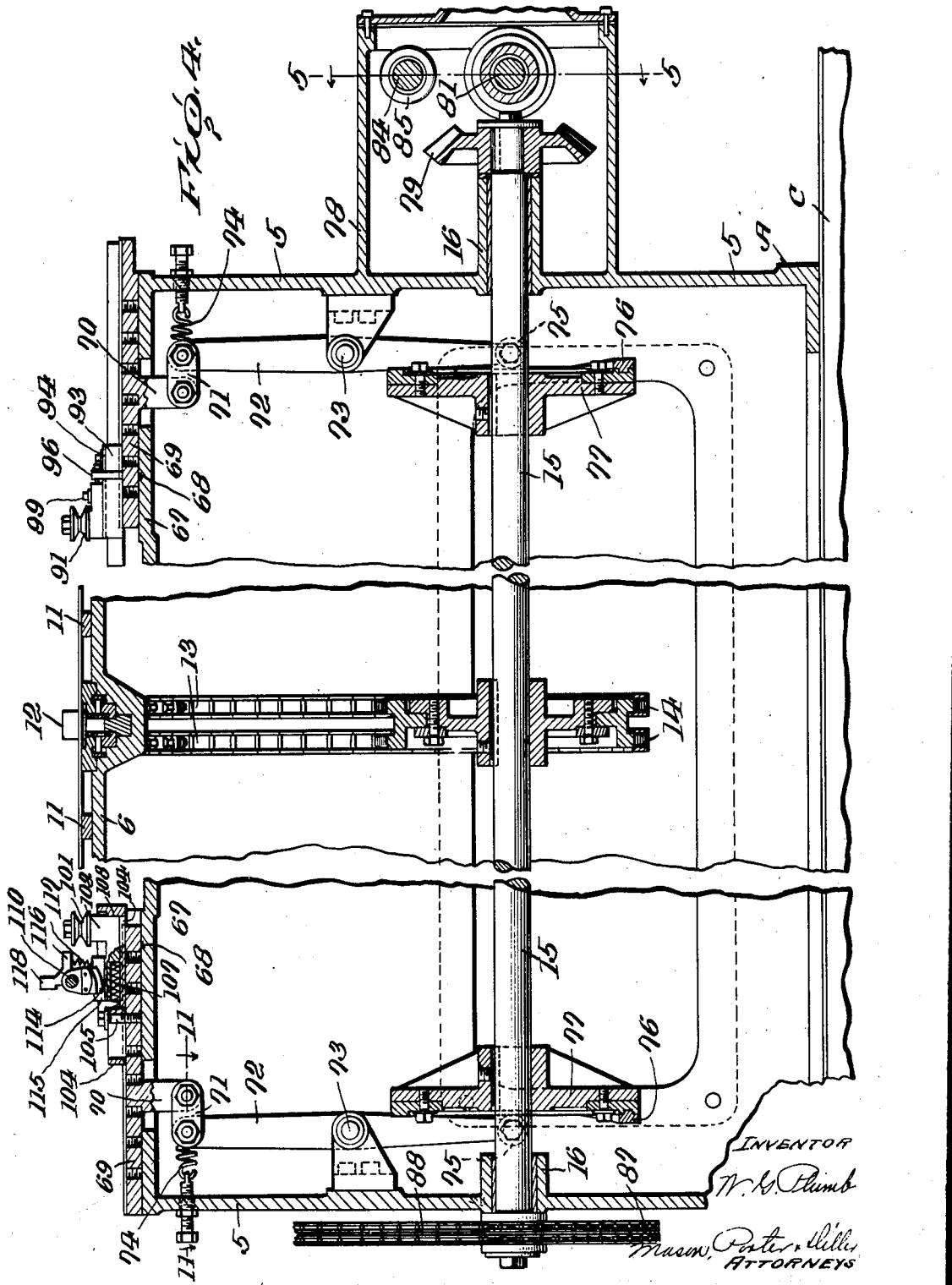

Nov. 16, 1943. W. G. PLUMB 2,334,645
FOUR-SQUARE SHEET TRIMMING MACHINE
Filed April 7, 1942 18 Sheets-Sheet 6
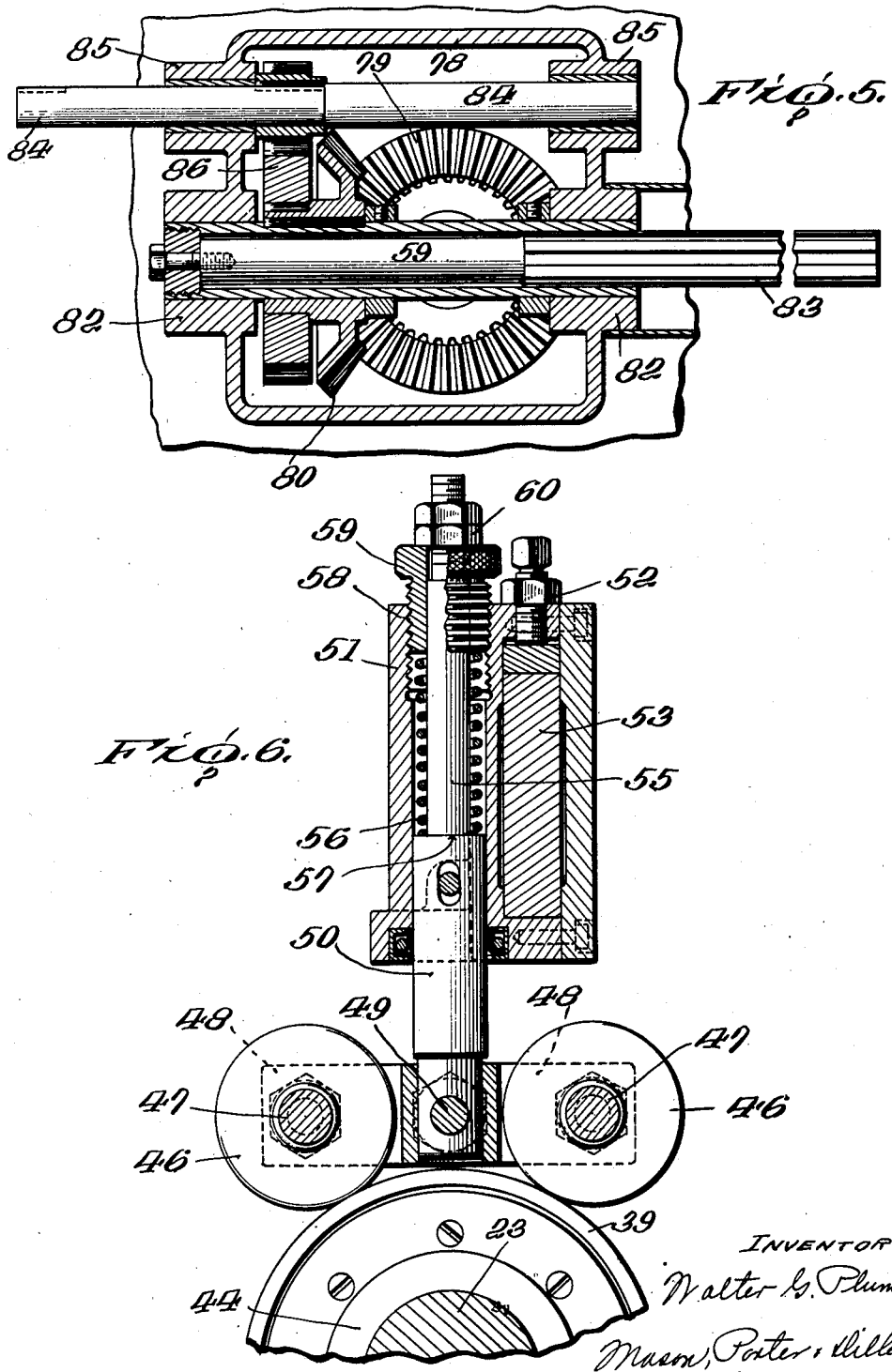

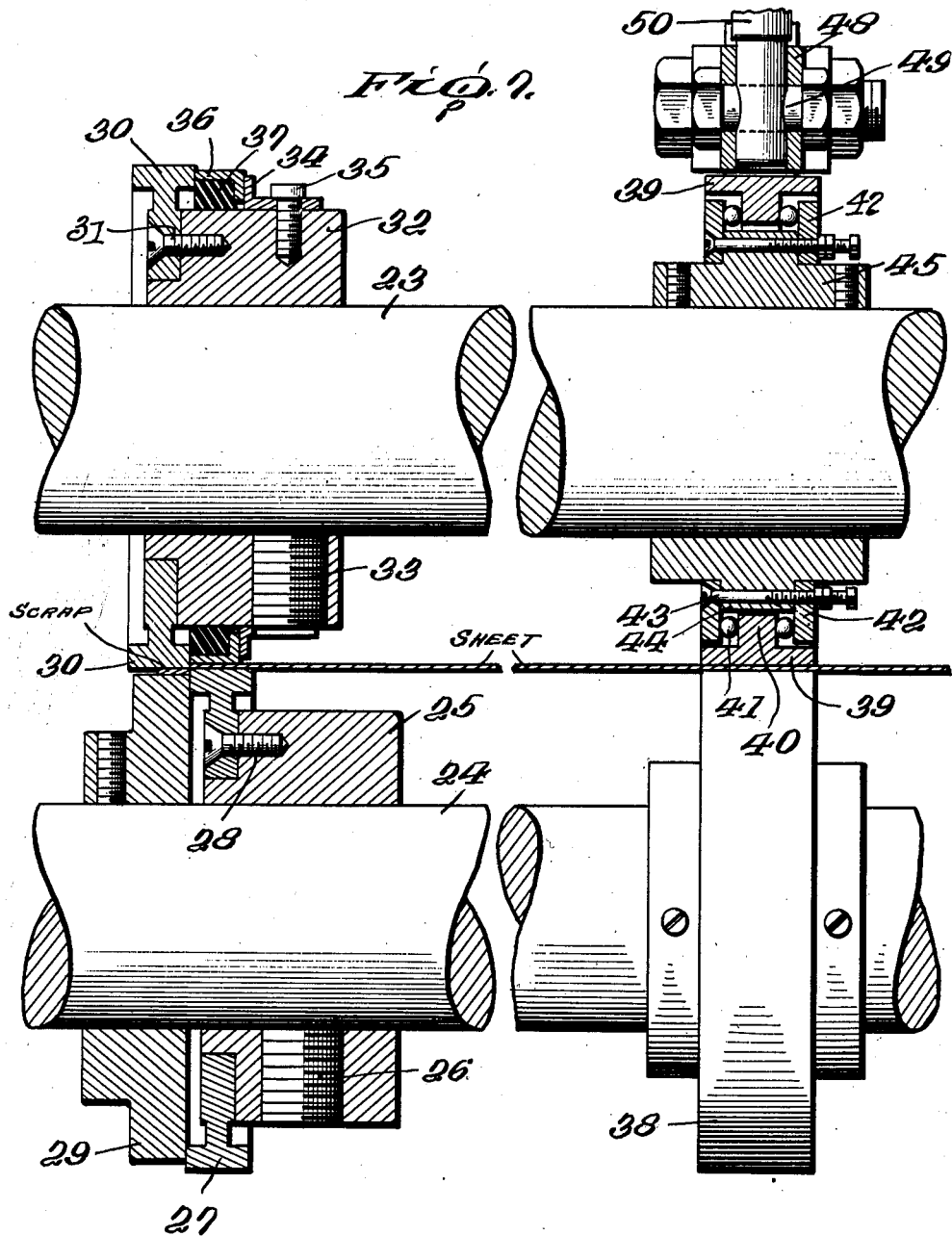

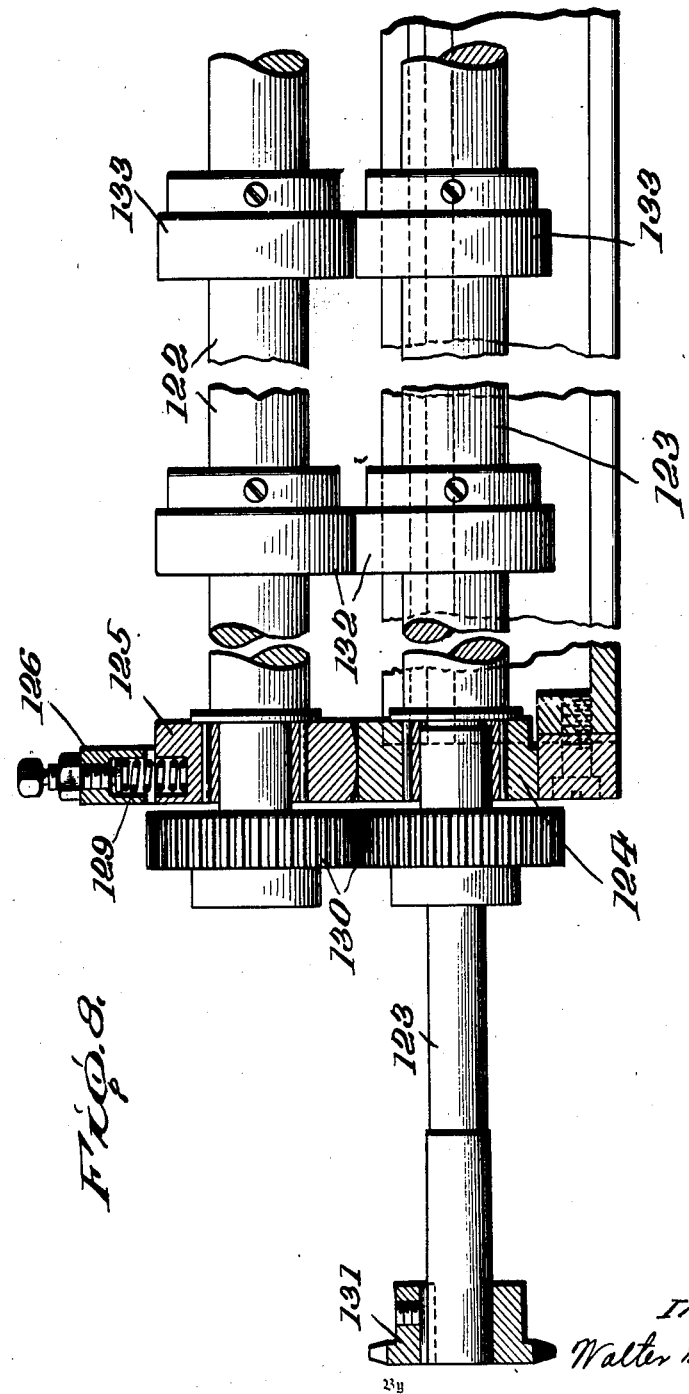

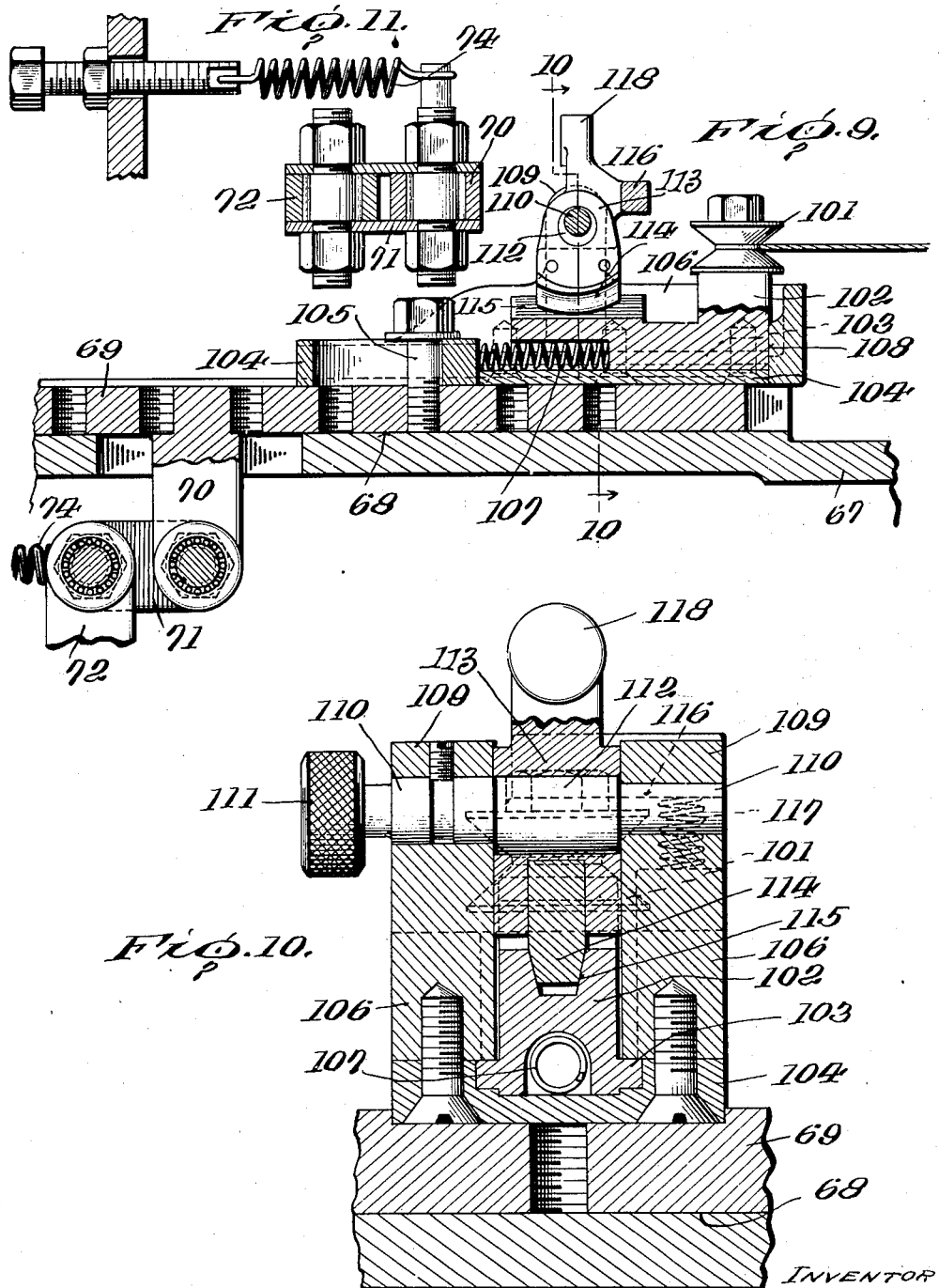

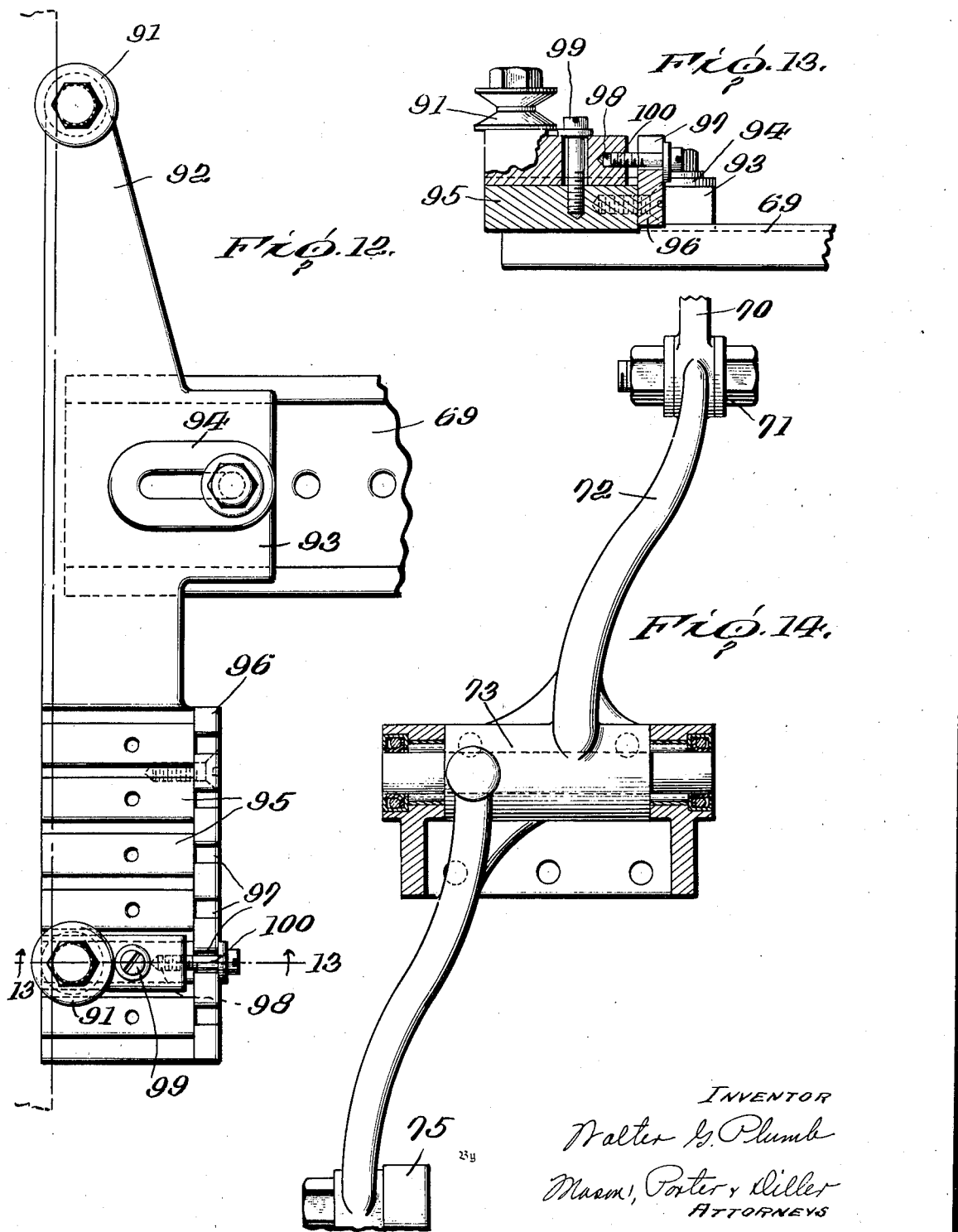

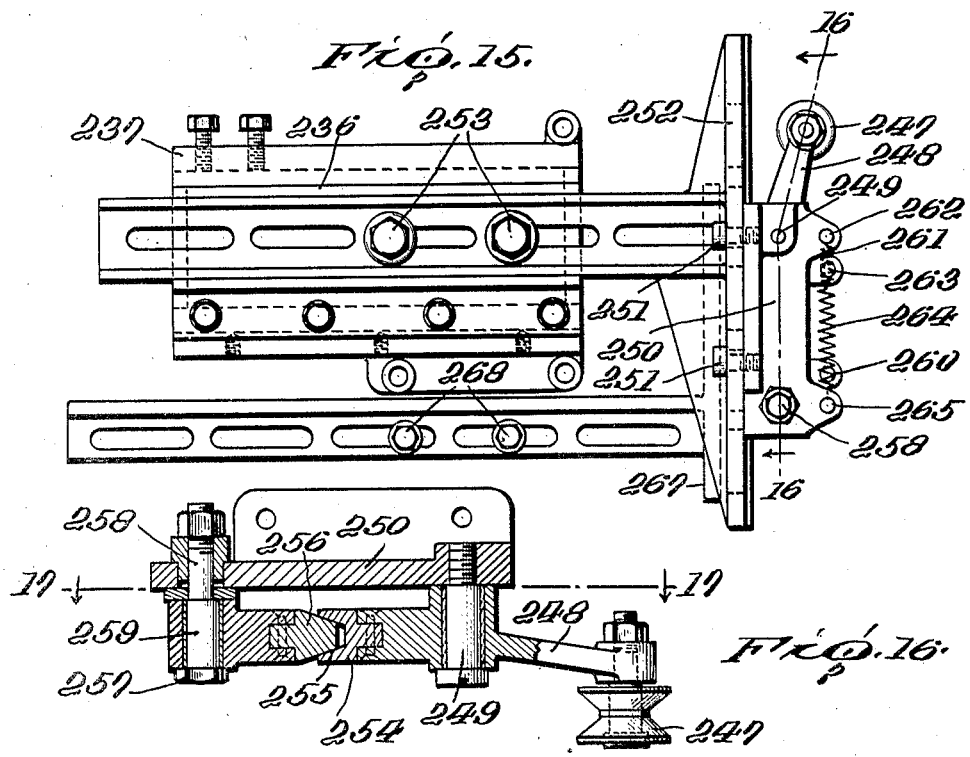
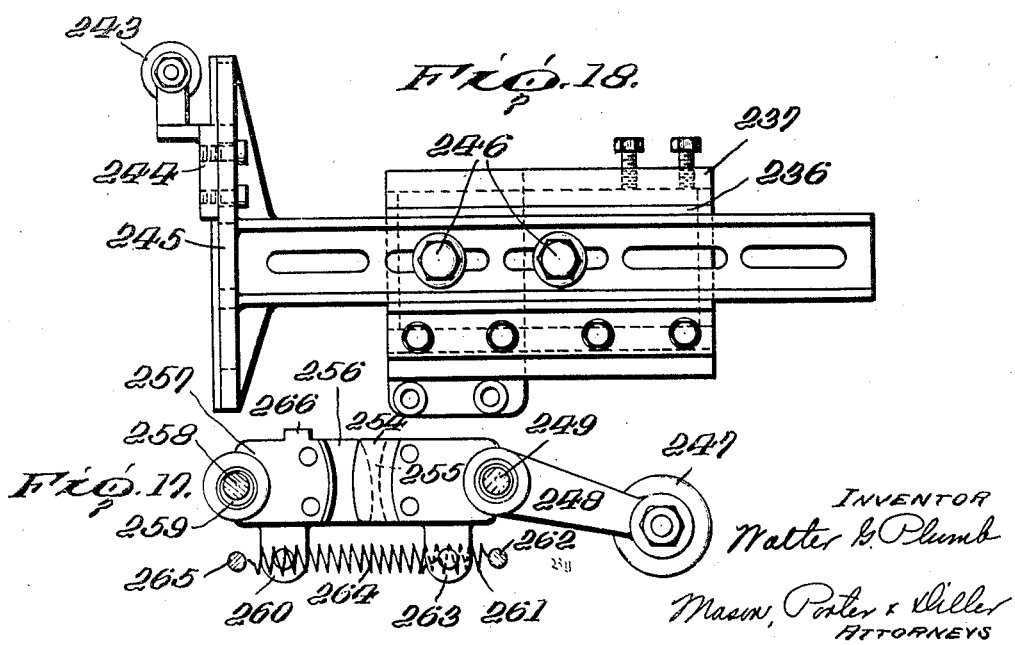

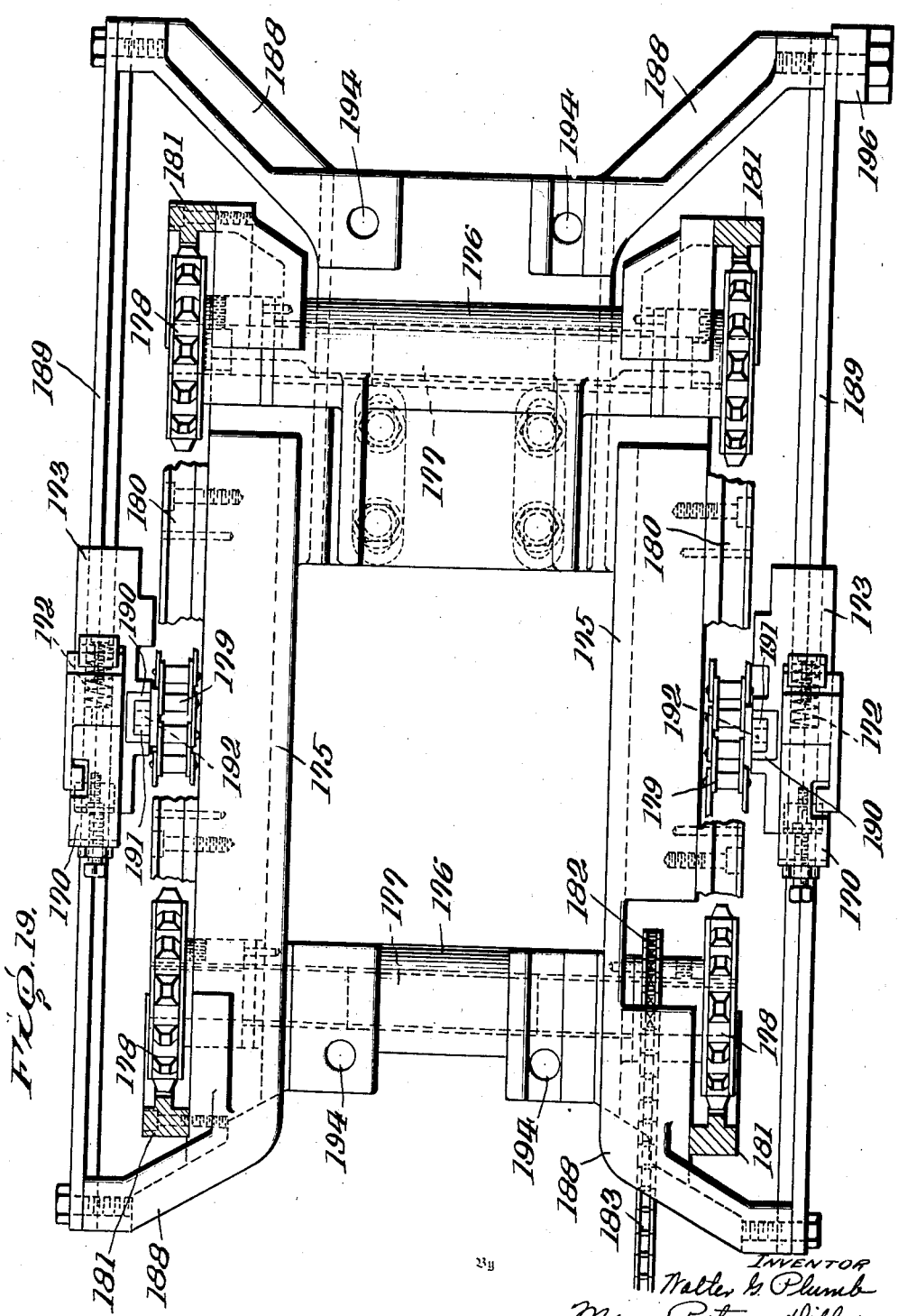

Nov. 16, 1943.  W. G. PLUMB  2,334,645
FOUR-SQUARE SHEET TRIMMING MACHINE
Filed April 7, 1942   18 Sheets-Sheet 13
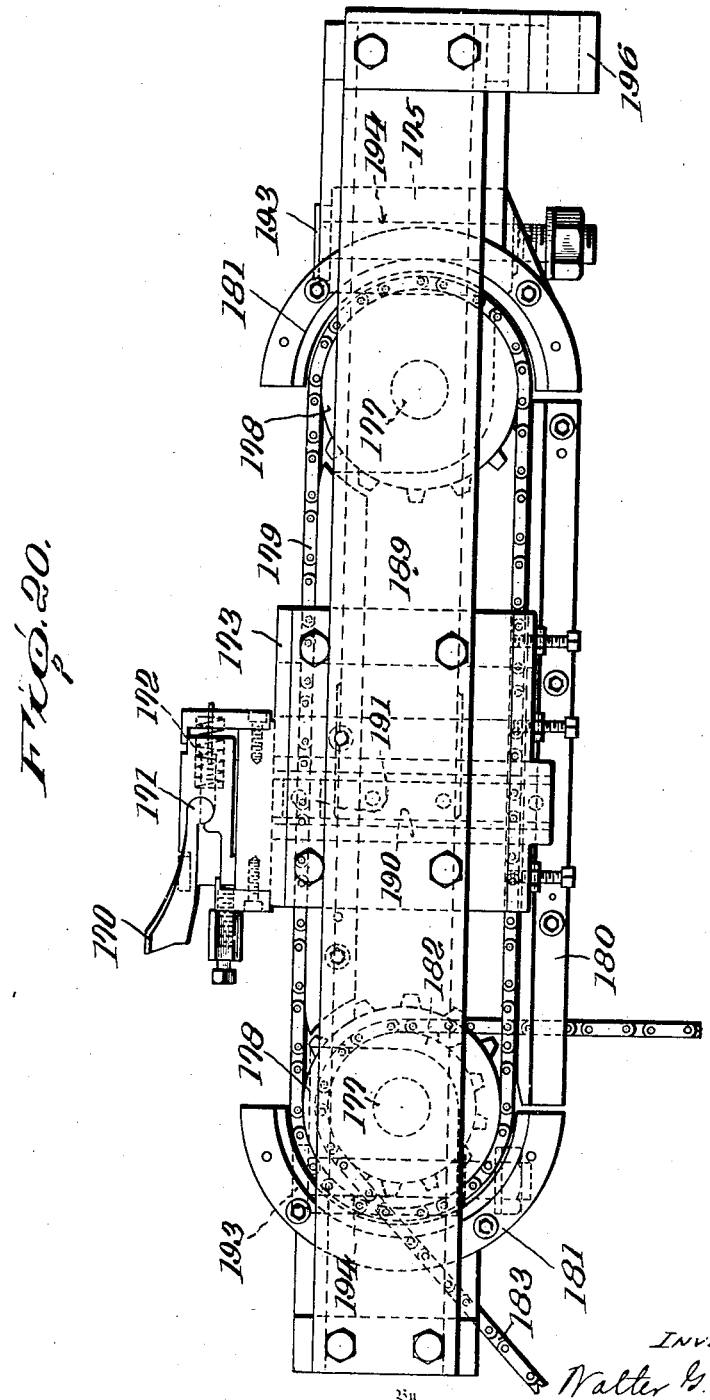

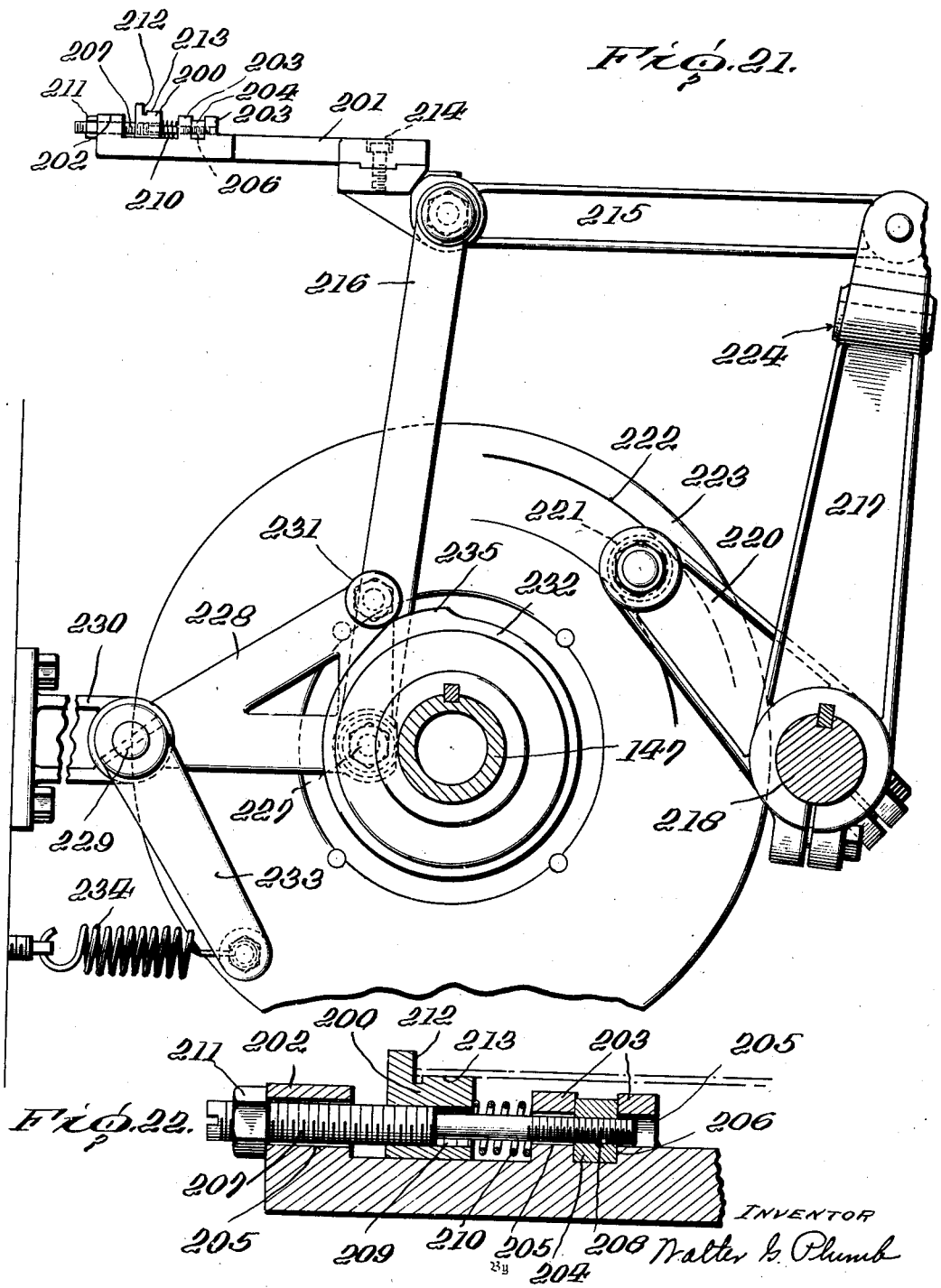

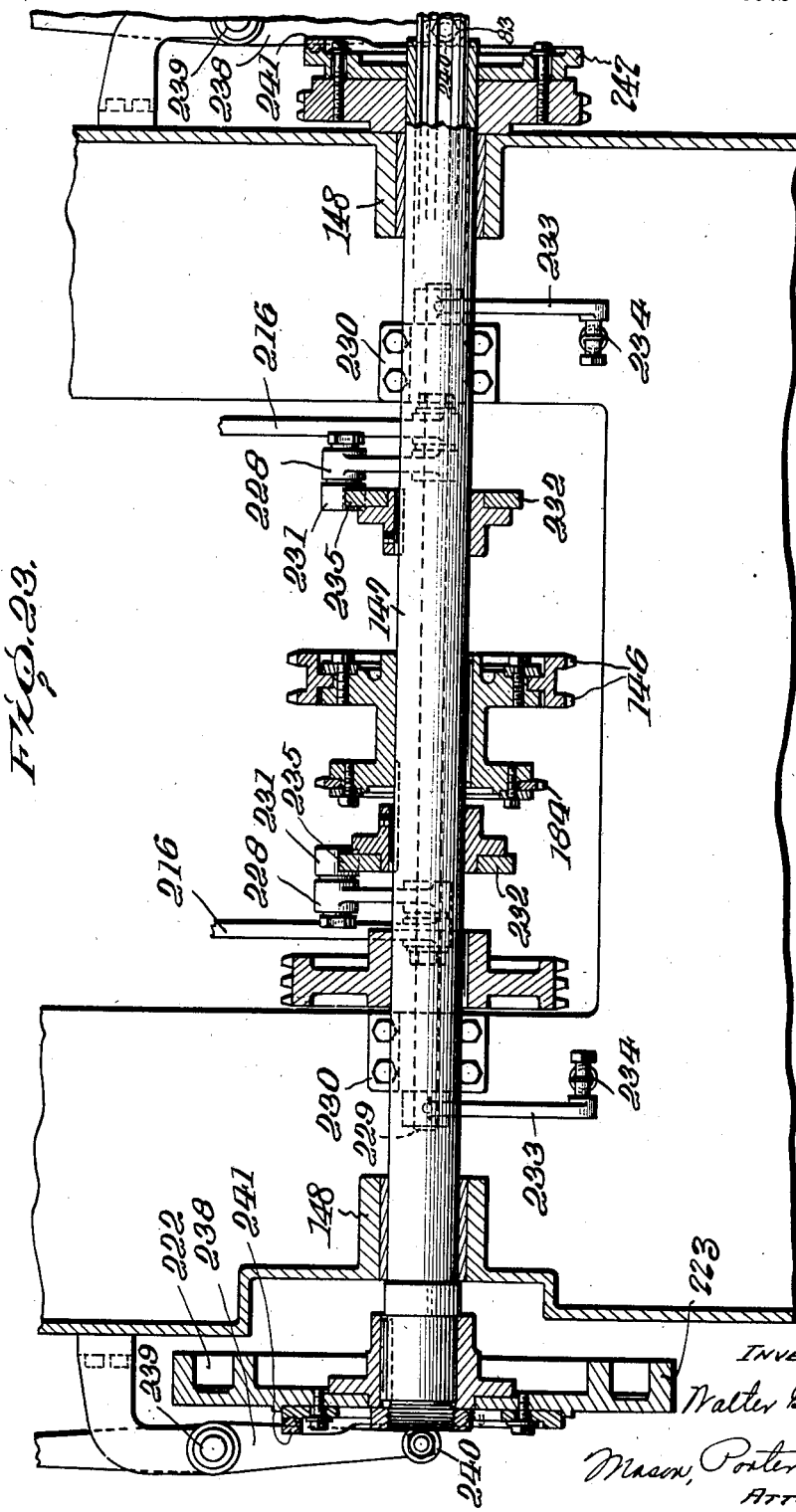

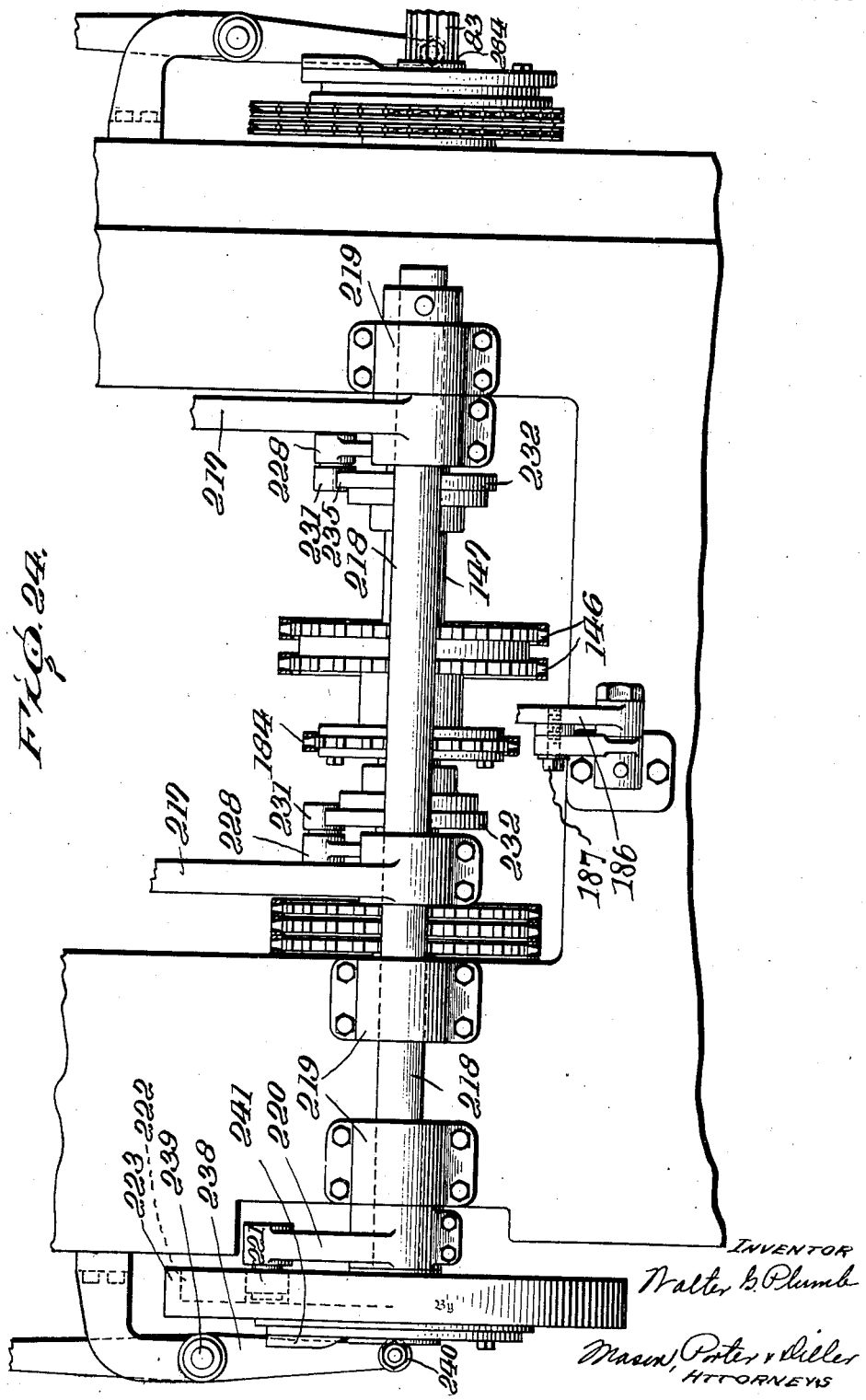

Nov. 16, 1943.  W. G. PLUMB  2,334,645
FOUR-SQUARE SHEET TRIMMING MACHINE
Filed April 7, 1942  18 Sheets-Sheet 17
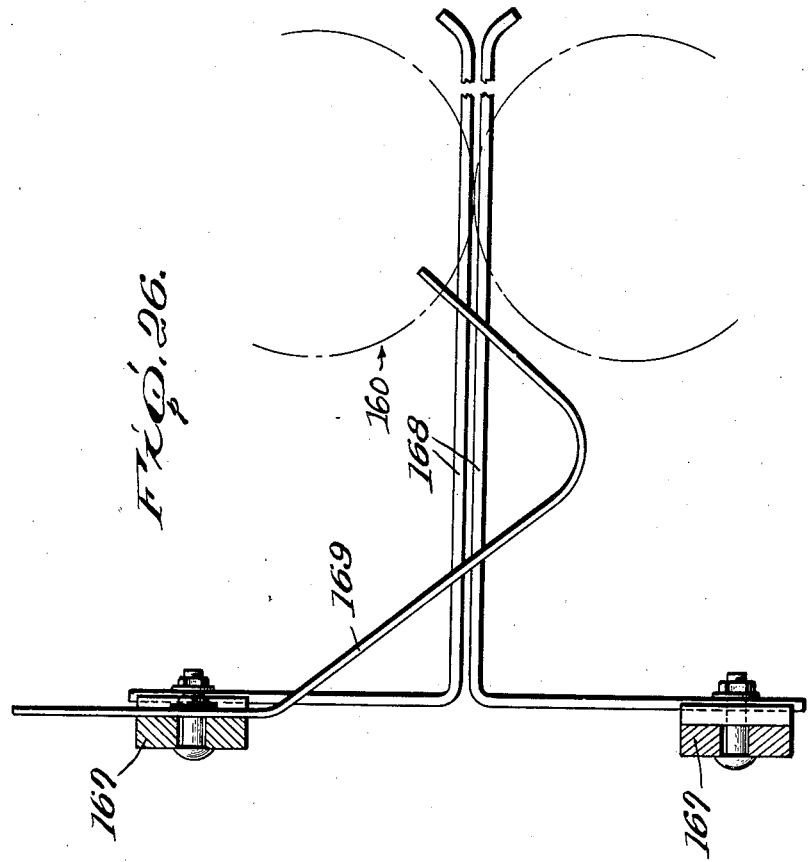
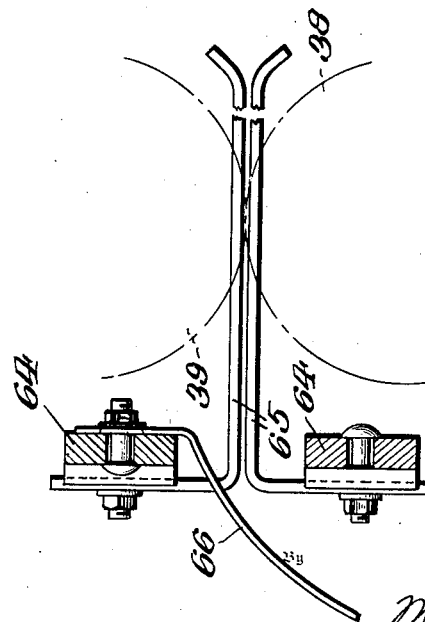
INVENTOR
Walter G. Plumb
Mason, Porter & Diller
ATTORNEYS

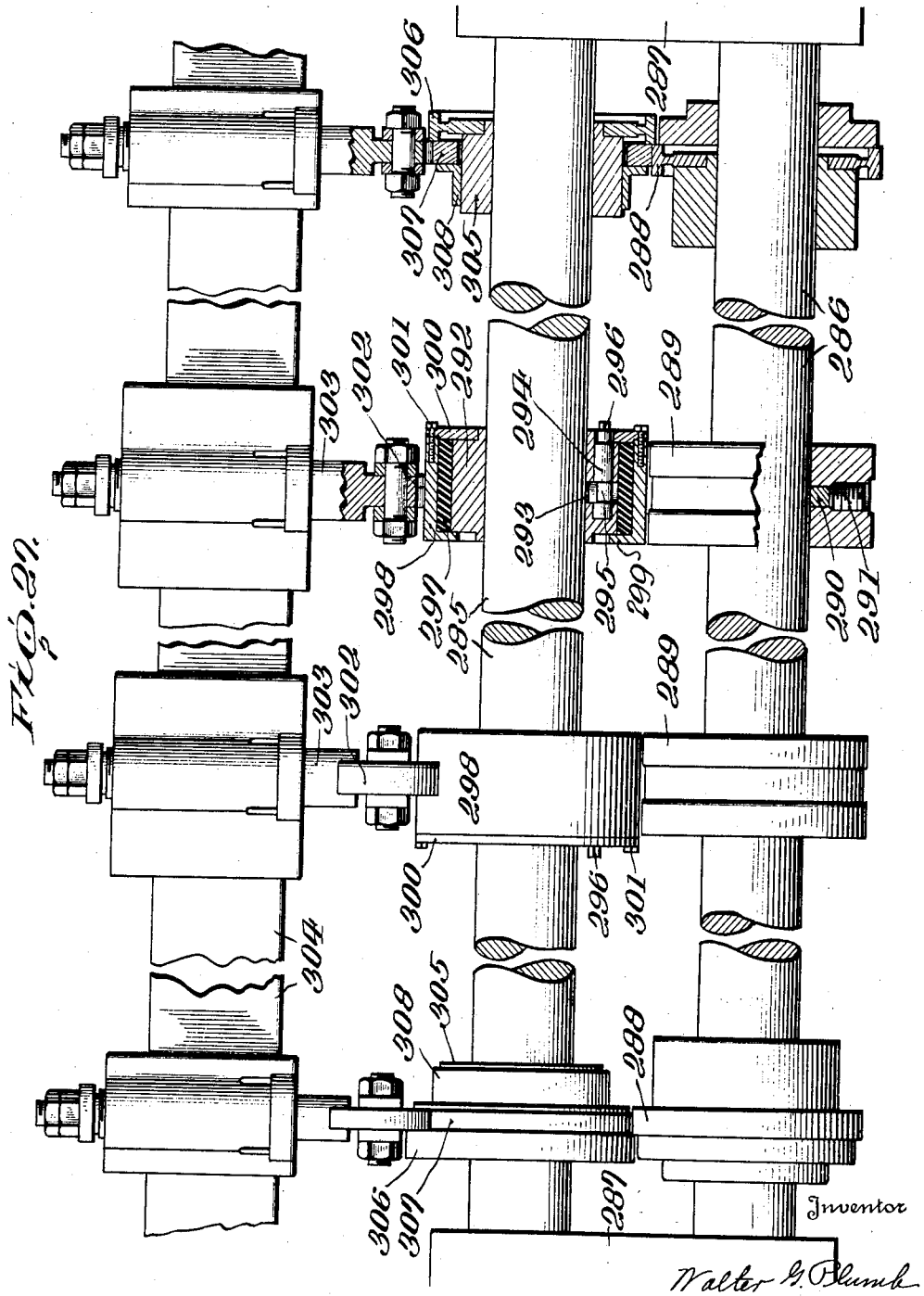

Patented Nov. 16, 1943

2,334,645

UNITED STATES PATENT OFFICE 2,334,645

FOURSQUARE SHEET TRIMMING MACHINE

Walter G. Plumb, Ridgewood, N. J., assignor to Continental Can Company, Inc., New York, N. Y., a corporation of New York Application April 7, 1942, Serial No. 438,037

56 Claims. (Cl. 164—62)

This invention relates generally to sheet trimming mechanisms and primarily seeks to provide a novel machine structure to which generally square sheets to be trimmed can be fed and wherein such sheets have edge portions trimmed therefrom, first along two generally parallel sides or ends, and then along the two remaining generally parallel sides or ends, in such manner as to provide perfectly square sheets.

It is well known that it is very difficult to provide perfectly square sheets, and yet it is necessary in the use of metal sheets for some purposes that the sheets be perfectly square. An example of such use is in the manufacture of crown caps or similar articles which have protective or decorative coatings thereon and are punched by gang dies from metallic sheets. The protective or decorative coatings are applied in symmetrically spaced relation on the sheets before the gang die punching takes place, and it will be obvious that unless the sheets are perfectly square so that the spotting is symmetrically and very accurately arranged within its borders, the spotting will be clipped during the subsequent gang punching operations and wastage of sheets or the provision of imperfectly punched units will result. It is the purpose of the present invention to provide a machine in which the sheets can be rendered perfectly square prior to operations of the nature stated so that the provision of imperfect articles or unnecessary wastage of sheets will be avoided.

An object of the invention is to provide a machine of the character stated wherein is embodied a first operation trimming unit on which two generally parallel sides or ends of sheets are trimmed, and a second operation trimming unit onto which the sheets are fed from the first operation unit in order to have the remaining generally parallel sides or ends trimmed, each said unit including a suitable framing structure, and both said units being mounted upon a common base, one of the units being movable toward or from the other of the units in order to alter the spaced relation of said units.

Another object of the invention is to provide a machine of the character stated in which each unit includes sheet feeding means, sheet gaging means, and sheet edge trimming means, a power source, and driving connections between the power source and the several means, there being included in the power transmitting connections extensible parts effective to permit adjustment of the relation of the two units without breaking the driving connections.

Another object of the invention is to provide a first operation trimming equipment of the character stated in which is included a novel arrangement of sheet feeding and gaging means including a lug-equipped chain or other suitable sheet advancing means and laterally reciprocable side edge gages, said gages including a single roller engageable with the sheet edge at one side and centered between two similarly reciprocable gage rollers at the opposite sides, thereby to provide 3-point gaging contact with sheets, there being included means for reciprocating the gages in timed relation with the advancing of the sheets so that the gages will engage the sheet edges prior to contact of the sheets with the trimming cutters and move out of contact with said sheets just after the edge trimming cutters have engaged said sheets and started their edge trimming function.

Another object of the invention is to provide in a sheet edge gaging equipment of the character stated, means for adjusting the lateral spacing of the gage sets, and means for adjusting the longitudinally spaced relation of the two rollers included in one of the gage sets.

Another object of the invention is to provide in a sheet edge gaging equipment of the character stated, means for yieldably mounting the single roller included in one of the gage sets so that it can be displaced by a slightly oversize sheet engaged thereby, means to lock the yieldably mounted roller in its displaced position, and means to release the lock when the particular gage set is next retracted laterally.

Another object of the invention is to provide in a machine of the character stated, novel rotary sheet edge trimming cutters and associated trimmed scrap supporting rotors effective to prevent bending and twisting away of the scrap.

Another object of the invention is to provide in a machine of the character stated, a novel arrangement of holddown means engageable over and effective to prevent buckling of sheets as they are being engaged by the gages and moving toward and through the edge trimming cutters.

Another object of the invention is to provide in a machine of the character stated, novel feed roller equipments mounted on the edge trimming cutter shafts and including floatably mounted rollers opposed to positively driven rollers and effective to prevent differential speed contact with the sheets which would be effective to mar the same.

Another object of the invention is to provide in a machine of the character stated, novel means for feeding the trimmed sheets away from the trimming cutters and including positively driven rollers for engaging the trimmed sheet edges and rolling down any edge burr which results from the trimming operation.

Another object of the invention is to provide in a machine of the character stated, novel adjustably mounted means for controlling the fall or drop onto the second operation trimming unit table of sheets fed from the first operation trimming unit table.

Another object of the invention is to provide in a second operation trimming unit of the character stated, novel combined lug-equipped chain and reciprocatory feeder means for advancing the sheets between the gaging equipments and to the edge trimming cutters.

Another object of the invention is to provide a sheet advancing means in a second operation trimming unit of the character stated in which means is provided for adjusting the reciprocatory feeding means relative to the chain feeding means.

Another object of the invention is to provide in a second operation trimming unit, sheet advancing means of the character stated, a reciprocatory feeding means which is adjustable longitudinally in the direction of sheet movement and which includes a reciprocatory feeder dog and endless chain means for imparting reciprocatory movement to said dog.

Another object of the invention is to provide a second operation trimming unit of the character stated in which is included novel sheet feed rectifying means comprising two rectifier fingers or abutments engageable by the advance edge of each advancing sheet just prior to engagement thereof with the edge trimming cutters, and novel means for causing the fingers to move with the sheet to very accurately present the same in parallel relation to the cutter axis until the sheet has been engaged and gripped by the cutters and then to cause said fingers to accelerate in movement forwardly and downwardly out of contact with the sheet so that the sheet can move thereover while the fingers are being returned rearwardly to be again moved up into position for intercepting and moving forwardly in rectifying contact with the next advancing sheet.

With the above and other objects in view which will more fully appear, the nature of the invention will be more clearly understood by following the description, the appended claims, and the several views illustrated in the accompanying drawings.

In the drawings:

Figures 1 and 1a joined at the lines A—B together comprise a plan view of a machine embodying the invention.

Figure 2 is a left side view looking at the second operation portion of the machine.

Figure 3 is a central longitudinal section taken through the first operation trimming portion of the machine, parts of the second operation trimming portion of the machine being broken away and shown in vertical transverse section.

Figure 4 is a vertical cross section taken on the line 4—4 on Figure 1, parts being broken away.

Figure 5 is a fragmentary vertical cross section taken on the line 5—5 on Figure 4.

Figure 6 is a fragmentary vertical cross section illustrating the pressure applying means associated with one of the floatably mounted feeding rolls.

Figure 7 is a fragmentary vertical longitudinal section illustrating one edge trimming cutter and scrap supporting equipment and one associated feed roll equipment.

Figure 8 is a fragmentary part vertical longitudinal section and part face view illustrating one of the burring roll sets and one associated set of the feedaway rolls forming a part of the first operation trimming unit.

Figure 9 is a fragmentary vertical cross section illustrating the yieldably mounted side gage and its mounting on the first operation trimming unit.

Figure 10 is an enlarged detail vertical cross section taken on the line 10—10 on Figure 9.

Figure 11 is an enlarged fragmentary horizontal section taken on the line 11—11 on Figure 4.

Figure 12 is an enlarged detail plan view of the sheet gaging equipment at the right hand side of the first operation unit.

Figure 13 is an enlarged detail vertical cross section taken on the line 13—13 on Figure 12.

Figure 14 is a detail view illustrating one of the gage reciprocating levers.

Figure 15 is a detail plan view illustrating the yieldably mounted gage equipment at the left hand side of the second operation unit.

Figure 16 is a detail vertical longitudinal section taken on the line 16—16 on Figure 15.

Figure 17 is a detail horizontal section taken on the line 17—17 on Figure 16.

Figure 18 is a detail plan view illustrating the gage equipment at the right hand side of the second operation unit.

Figure 19 is a detail plan view illustrating the reciprocatory feeding means employed in the second operation units, parts being broken away and in section.

Figure 20 is a left side elevation of the reciprocatory feeding means shown in Figure 19.

Figure 21 is a fragmentary vertical cross section illustrating in left side elevation the sheet rectifying finger equipment and the means for imparting 4-motion advancing and return movements thereto.

Figure 22 is a detail longitudinal section through one of the rectifying fingers.

Figure 23 is a vertical cross section taken through the axis of the main cam shaft on the second operation trimming unit, parts being broken away.

Figure 24 is a fragmentary face view illustrating the rock shaft to which rocking movement is imparted for advancing and retracting the rectifying fingers and the mounting thereof.

Figures 25 and 26 are fragmentary vertical cross sectional views illustrating the scrap diverting means associated respectively with the edge trimming cutters of the first and second operation units.

Figure 27 is a fragmentary face view illustrating a modified form of feed roll and edge trimming cutter arrangement.

In the example of embodiment of the invention herein disclosed, there is included a first operation trimming unit mounted on a suitable framing and generally designated A, and a second operation trimming unit mounted on a suitable framing and generally designated B, both said units being supported on a common base generally designated C. See Figures 1, 1a, 2 and 3 of the drawings.

The first operation trimming unit

The first operation trimming unit comprises a supporting frame 5 which supports or includes a main table or bed portion 6 from which extends an extension table portion 7 which is supported at its free ends on stay rods 8. See Figures 1 and 3 of the drawings.

On the table 6, 7 is provided a sheet feedway between laterally spaced side guide rails 9 which are laterally-adjustably mounted as at 10. See Figure 1. On the feedway the sheets slide over adjustably mounted parallel slide rails 11, a greater or lesser number of which are provided according to the width of sheets being fed and trimmed. The rails 11 preferably are chromium plated so as to reduce friction and avoid marring of the sliding sheets.

The sheets to be trimmed are fed onto the feedway by any approved sheet feeding mechanism (not shown), and are fed over the feedway by properly spaced lugs 12 projecting upwardly from the endless double conveyor chain 13 which passes over driver sprockets 14 secured on the drive shaft 15 rotatable in frame bearings 16, and over idler sprockets 17 one of which is fixedly mounted in the manner illustrated in Figure 3 and the other of which is supported in a bracket 18. The bracket 18 is slidably mounted, as at 19, on the table extension 7 and is yieldably urged in a direction for holding the chains tight by a spring tensioning equipment generally designated 20. See Figures 1 and 3.

First operation trimming cutters and feed rolls

Upstanding from the main table 6 are two frame standards 21 disposed in laterally spaced, parallel relation. The standards 21 are equipped with suitably fixed bearings 22 in which upper and lower parallel cutter shafts 23 and 24 are rotatably mounted. See Figures 1, 3 and 7.

Toward each end thereof, each lower shaft 24 is equipped with a hub 25 which is longitudinally adjustably affixed thereon, as at 26, and has a trimming cutter disk 27 removably fixed thereto as is clearly indicated at 28 on Figure 7. Disposed in end abutment with each cutter disk 27 and endwise thereof is mounted a scrap supporting rotor 29, said rotor being of slightly smaller diameter than the cutter disk. A cutter disk 30 is provided toward each end of the upper shaft 23 in position for directly overlying one of the scrap supporting rotors 29 and for cooperating in sheet edge trimming relation with the adjacent cutter disk 27 which it slightly overlaps in shearing relation in the manner clearly illustrated in Figure 7 of the drawings. Like the cutter disks 27, the cutter disks 30 are removably secured, as at 31, on hubs 32 which are in turn longitudinally, adjustably secured, as at 33, on the shaft 23.

It will be observed by reference to Figure 7 of the drawings that each of the hubs 32 carries a flange ring 34 which is removably secured thereon, as at 35, and each flange ring 34 serves to floatably mount an L-shaped presser or stripper ring 36 within which is confined a rubber ring 37. Each floatably mounted ring equipment 36, 37 abuts the adjacent cutter disk 30, and, as a result of the natural tendency of the confined rubber ring 37 to expand to its normal thickness after having the portion thereof in immediate engagement over the respective cutter disk 37 compressed during the progressive trimming function, serves to press downwardly on the respective trimmed edge of the sheet and press the same downwardly or strip the same from the cutting edge of the disk 30.

Depending upon the dimensions of the sheets being trimmed in the machine, a greater or lesser number of feed roll equipments are mounted on the upper and lower cutter shafts 23, 24 intermediately of the longitudinally spaced edge trimming or cutting equipments. One set of feed rolls is illustrated in detail in Figures 6 and 7 of the drawings. Each feed roll set includes a feed roll 38 fixed to the lower shaft 24 and opposed by a feed roll 39 floatably mounted on the upper shaft 23. Each floatably mounted roll includes an inwardly directed flange 40 which engages between ball bearings 41 interposed between the sides of this flange and laterally spaced side plates 42 which are secured as at 43, at opposite sides of a flange 44 projecting outwardly from the mounting hub 45 secured upon the shaft 23. It will be observed by reference to Figure 7 that clearances are provided between the opposing flanges 44 and 40, and between the external surfaces of the annular plates 42 and the inner surfaces of the main body portion of the respective roll 39. Thus the rolls 39 are capable of moving independent of the supporting hubs 45, and a traveling of the sheet engaging surfaces of the coacting rolls 38 and 39 at like surface speeds is assured so that any danger of the rolls dragging on and marring the contacted sheets is avoided.

No pressure is applied to the floatably mounted rolls 39 when sheets are not actually being engaged by these rolls. This feature of avoiding pressure application except when sheets are actually being fed is accomplished in the following manner and by reason of the provision of the equipment shown in detail in Figure 6. Two pressure rolls 46 overlie and are engageable at opposite sides of the center with each floatably mounted roll 39. Each pressure roll 46 is rotatably supported, as at 47, at a forwardly or rearwardly projected end of a carrier 48 which is secured, as at 49, to the lower end of a stem 50 vertically reciprocable in a bearing 51. The two bearings 51 which support the two sets of pressure rolls are secured, as at 52, on a cross bar 53 which is in turn secured as at 54, on the frame standards 21 in the manner clearly indicated in Figures 1, 2, 3 and 6 of the drawings. Each stem 50 includes a reduced diameter upper end portion 55 which is surrounded by a compression spring 56 interposed between the shoulder 57 provided by the reduction of the stem and the lower end of a nut 58 which is threadably mounted in the upper end of the respective bearing 51. Each nut 58 is equipped with a bore 59 for slidably receiving the stem portion 55, and adjustable abutment nut equipments 60 are provided at the upper end of each said stem portion.

The nuts 58 cooperate with the abutment nut equipments 60 in limiting downward movement of the stems 50 under the urge of the springs 56, and the nuts 60 and 58 are so adjusted that they place the pressure rolls 46 to apply pressure on the floatably mounted rolls 39 only when a sheet is interposed between the rolls 39 and 38 and being fed thereby.

Another cross bar 61 is secured to the standards 21 in the manner clearly illustrated in Figures 1 and 3 of the drawings, and a plurality of brackets 62 are secured to the bar and carry holddown members 63 preferably formed of individual straps of spring metal dimensioned to overlie and yieldably oppose the slide rails 11. The brackets 62 and the holddown elements 63 correspond in number to the number of slide rails being employed in the particular setup of the machine. It will be obvious that when narrow sheets are being fed, only two such equipments may be found necessary as illustrated in Figure 1. The hold-down elements 63 engage the sheets while they are being fed to the cutters and edge gaged and serve to prevent buckling of these sheets.

Other upper and lower supporting bars 64 may be secured to the standards 21, and these bars serve as supports for upper and lower sheet guiding straps 65 which guide and support the sheets while they are passing through the cutters, thereby to assure against any buckling or distortion of the sheets out of the horizontal plane such as might tend to disrupt the efficiency of the edge trimming function.

The bars 64 may also be utilized to support scrap deflectors or guide members 66 which extend beyond and in alignment with the edge trimming cutter equipments in position for engaging and downwardly deflecting the scrap resulting from the trimming of the sheet edges. It is to be understood that the scrap supporting rotors 29 effectively prevent twisting and curling of the scrap, and by reason of the provision of the deflectors 66, the scrap is directed away from operating parts of the machine and may be collected in suitable receptacles without danger of entanglement in machine parts. See Figure 25.

At each side, the main table 6 has a depressed portion 67 equipped with a gage slide guide 68 for receiving a slide gage block 69. Each gage block 69 is equipped with a depending arm 70 which is link-connected, as at 71, to the upper end of an actuator lever 72. Each lever 72 is pivoted intermediate its ends, as at 73, on the frame structure 5, and an adjustably anchored spring 74 constantly tends to hold the slide in its retracted position.

At its lower end, each lever 72 is equipped with a roller 75 which is held by the respective spring equipment 74 against an actuator cam 76 removably attached to a cam disk 77 secured upon the drive shaft 15. It will be obvious that as the shaft 15 is rotated, the cams 76 will at the proper time impart reciprocatory movements to the slidable gage blocks 69. The cams are identical in form and are so related that the gage blocks 69 move outwardly and inwardly substantially together, with the gage block at the left hand side of the machine, looking in the direction of feeding movement of the sheets, moving slightly ahead of the right hand block in both directions of movement. The purpose of causing the left hand gage block to move slightly in advance of the other block, particularly in the direction of retraction of the block, will become apparent when the gage equipment on this first operation unit is described in detail hereinafter.

The drive shaft 15 is extended at one side into a drive gear housing 78 and therein is equipped with a bevel gear 79 through which rotation is imparted to the shaft by a bevel gear 80 secured on a drive shaft 81 which is rotatable in housing bearings 82. The shaft 81 is extended from the housing toward the second operation trimming unit and is there splined, as at 83, for a purpose that will later become apparent. A power take off shaft 84 is rotatably supported in housing bearings 85 directly above and in parallel relation to the drive shaft 81 and is driven from said drive shaft through the medium of a spur gear couple 86. See Figures 1 and 4 of the drawings.

The shaft 84 extends from the housing in the manner illustrated in Figure 1 and can be employed as a driving connection from which power may be applied to a sheet feeding mechanism (not shown) positioned for feeding sheets one after another onto the feedway hereinbefore referred to.

At its opposite end the drive shaft 15 is equipped with a driver sprocket 87, and a chain 88 passes over said sprocket and over a sprocket 89 mounted on the lower cutter shaft 24, thereby to impart rotation to the shafts 24 and 23 which are connected in driving relation by the spur gear couple 90.

*First operation trimming unit gage equipment*

The gage equipment for the first operation trimming unit includes the reciprocable slide blocks 69 whereon the gages are mounted, and these gages comprise gaging units of different construction mounted respectively at the right and left hand sides of said unit.

The gage at the right hand side of the unit comprises two longitudinally spaced, fixedly mounted and grooved gage rollers 91. One of these rollers is fixedly mounted at the advanced end of an elongated carrier 92 having a body portion 93 which is laterally, adjustably secured, as at 94, to the respective gage block 69. At its trailing end, the carrier 92 is provided with a plurality of selective, transverse grooves 95 and a plate 96 which is secured to the right hand edge of the carrier and extends vertically thereabove in the manner clearly illustrated in Figures 12 and 13 of the drawings. The upwardly extended edge portion of the plate 96 is equipped with a plurality of notches 97, each of which is aligned with one of the selective grooves 95. A block 98 carrying the other of the fixed and longitudinally spaced gage rollers 91 is secured, as at 99, in one of the grooves 95, said block being longitudinally adjustable in the groove through the medium of the adjuster screw 100 which is threaded therein and passes through the adjacent plate notch 97.

At the other or left hand side of the unit the grooved gage roller 101 is supported on a block 102 which is laterally, slidably guided, as at 103, in a carrier 104 which is laterally, adjustably secured, as at 105, on the respective slide block 69. The carrier 105 is equipped with parallel upstanding side walls 106 between which the block 102 is mounted, and a compression spring 107 is interposed between the block 102 and an opposed wall of the carrier 104 in the manner clearly illustrated in Figures 9 and 10 of the drawings and constantly tends to hold the block against the inner wall 108 of said carrier, thus yieldably mounting the roller 101.

The sheets which are fed through the machine are only generally square and approximately uniform in dimensions, dimensions across or lengthwise of the sheets sometime varying as much as a quarter of an inch. With the gages at one side of the unit fixedly supported, it is very desirable to yieldably mount the gage equipment at the opposite side so as to accommodate these variations in sheet dimensions. It will be obvious, however, that if the gages are moved simultaneously into contact with the edges of the sheet to properly gage the same and then similarly moved apart, the yieldably mounted gage might rebound and impart a lateral movement to the sheet which would disrupt the gaging function. In the present machine, however, this lateral shifting of the sheet is assured against in two ways. First, provision is made to retract the yieldably mounted gage roller slightly in advance of retraction of the fixedly mounted gage roller so that any displacement of the roller 101 effected by engagement with an oversize sheet can be restored while the opposing or fixedly mounted gage rollers 91 are in position to resist lateral movement of the sheet, and thus no lateral shifting of the sheet can occur during the retraction of the gages. Secondly, means is provided for locking the yieldably mounted roller 101 in any position to which it might be displaced by contact with an oversize sheet, and releasing the lock and permitting return to normal of the roller 101 only after said roller has been moved clear of any possible lateral shifting contact with the sheet. This locking equipment will now be described.

The side walls 106 of the carrier 104 are extended upwardly to provide bearing hubs 109 which serve to rotatably support an adjuster shaft 110 having a knurled head 111 at one end and an eccentric central portion 112 disposed between the hubs 109 in the manner best illustrated in Figures 9 and 10 of the drawings. A lock member 113 is rockably mounted on the eccentric shaft portion 112 and is equipped at its lower end with a beveled and eccentrically disposed wedge 114 which is engageable in a beveled groove 115 formed in the upper surface of the slide block 102. Above the axis of the shaft 110 the lock member 113 is provided with an extended arm or lug 116, and a compression spring 117 is interposed between the under surface of this lug 116 and an underlying portion of one of the walls 106 so as to be effective to constantly urge the lug 116 upwardly and the lower end of the locking element inwardly or toward the right as viewed in Figure 9. The relation of the wedge and groove equipments 114, 115 is such that sliding outward movement of the block 102, or movement to the left as viewed in Figure 9, is not resisted by the lock element 104, but any tendency of this block to move to the right will cause the eccentric wedge surface 114 to wedge in the groove 115 and prevent this return movement of the block 102. Thus each time the roller 101 is displaced toward the left by engagement with an oversized sheet, the roller will be locked in its displaced position by the lock element portion 114 until the lock member 113 is swung about its pivotal mounting in a direction for releasing this wedging action. The means for releasing this wedging action will now be described.

A release lug 118 projects upwardly from the lock member 113 and is engageable with an adjustable abutment 119 carried by an arm 120 which is adjustably mounted, as at 121, on the unit bed 6. The release lug 118 is engaged to effect a tripping or release movement of the lock member 113 upon each retraction of the gage slide block 69.

*Burring and take-away rolls*

The first operation trimming equipment is completed by a set of burring and take-away rolls which may or may not be mounted on the first operation unit framing. It is preferred that this equipment be mounted on the second operation trimming unit frame because these framing units are mounted for relative movement of separation, for a purpose that will later become apparent, and by mounting this equipment on the second operation unit framing, the intended spacing of these framings can be accomplished with greater facility.

The burring and take-away roll equipments comprise upper and lower shafts 122 and 123, the lower shaft being supported in fixed bearings 124 and the upper shaft in upwardly yieldable bearings 125 mounted in standards 126 projecting upwardly from a transverse frame member 127. The frame member 127 is adjustably mounted, as at 128, preferably on the second operation trimming unit table as above stated. Compression springs 129 press the upper shaft 122 downwardly, and a spur gear couple 130 connects the shafts for movement in unison, the lower shaft being driven by a sprocket and chain connection 131 from the lower cutter shaft 24.

Cooperating burring rolls 132 are mounted on the shafts 122 and 123 in position for engaging the trimmed edge portions of sheets fed through the first operation trimming unit, and a plurality of intermediate rolls 133 are mounted in cooperative relation on said shafts between the two sets of burring rolls. The intermediate rolls 133 are normally spaced .008" apart and serve more as sheet holding means than as feed rolls, thereby to guard against marring of the sheets and also against any tendency of the sheets to buckle. While traveling to the burring and intermediate rolls 132, 133 the sheets pass over a receiving table 134 which is removably secured to the supporting standards 126.

*The second operation trimming unit*

The second operation trimming unit comprises a supporting frame 135 which supports a main table or bed portion 136 from which extends an extension table portion 137 which is supported at its free end on stay rods 138. The framing 135 also includes a frame table extension 139 whereon is secured an electric motor 140 constituting the source of power from which all moving parts of the machine are operated.

On the table 136, 137 a sheet feedway is provided between laterally spaced, parallel side guide rails 141 which are laterally, adjustably mounted as at 142. It is preferred that the side guide nearest the first operation trimming unit comprise a portion of the transverse frame member 127 which supports the burring and take-away rolls because by this arrangement the rolls 132, 133 will be disposed in position for efficiently delivering onto the sheet feedway of the second operation trimming unit the sheets which have had two opposite edge portions thereof edge trimmed and rendered perfectly parallel. It is to be understood, however, that this side guide may constitute a separate adjustable element as on the first operation trimming unit table if desired.

While being fed over the slideway onto this unit the sheets slide over parallel slide rails 143 which preferably are chromium plated for the purpose of reducing friction, and the sheets are conveyed by properly spaced lugs 144 projecting upwardly from an endless double chain 145. This chain passes over driver sprockets 146 mounted on the main drive or cam shaft 147 which is rotatable in frame bearings 148, and over two idler sprockets, one 149 of which is fixedly mounted in the position illustrated in Figure 2, and the other 150 of which is supported in a bracket which is slidably mounted, as at 151, on the table extension 137 and is yieldably urged toward the end of said table extension by a tensioning spring equipment 152 effective for constantly holding the chain taut.

In dropping onto the second operation trimming unit table the sheets are guided over a drop bar 153 which is hooked, as at 154, over the side guide 141 nearest the first operation trimming unit and is longitudinally, adjustably secured, as at 155, to the other side guide 141. The drop bar is lined up with the trimmed right hand edge of each sheet as it is delivered from the first operation trimming unit and serves to support that edge as it is delivered onto the table in a manner for allowing the chain lug conveying the preceding sheet to move away without interference.

*Second operation trimming cutters and feed rolls*

Frame standards 156 project upwardly from the main table 137 in laterally spaced parallel relation and support suitable fixed bearings 157 for upper and lower cutter shafts 158 on which are mounted sheet edge trimming equipments which preferably are identical in form and general arrangement with those previously described in connection with the first operation trimming unit. Because of the fact that these edge trimming equipments are identical with those previously described in detail, it is thought to be unnecessary to again describe them in detail and they are generally designated 159 on the second operation trimming unit. The feed roll equipments disposed intermediately of the laterally spaced edge trimming equipments similarly are identical in construction with those previously described, and these are generally designated 160 on this second operation trimming unit. The standards 156 support a cross bar 161 whereon are mounted the same type of pressure applying equipments overlying the floatably mounted feed rolls, and these pressure applying equipments are generally designated 162 on this second operation trimming unit.

The standards 156 also support another cross bar 163 whereon are mounted brackets 164 and holddown straps 165 similar in construction and function to those described in detail in connection with the first operation trimming unit. On this unit, however, additional holddown straps 166 are provided and these are supported on the drop bar 153 in position for cooperating with the straps 165 in securing against buckling the sheets being fed to the edge trimming devices.

Additional upper and lower bars 167 are mounted on the standards 156 and serve to support upper and lower guide straps 168 between which the sheets pass as they are being edge trimmed and which serve the same sheet plane maintaining function previously described in connection with the similar equipments provided on the first operation trimming unit. The bars 167 may also serve as supporting means for scrap deflectors 169 which serve the scrap guiding function previously described in detail in connection with the first operation trimming unit. See Figure 26.

*The sheet rectifying means*

The main feed chain 145 is supplemented by a reciprocatory sheet feeder including two laterally spaced sheet feeding fingers 170. See Figures 1a, 3, 19 and 20.

Each of the fingers 170 is pivotally mounted, as at 171, and is yieldably-slidably mounted, as at 172, on a slide block 173 and is reciprocable back and forth in a longitudinal slot 174 provided in the frame table portions 136, 137. This reciprocating feeder equipment is a unit structure which is longitudinally adjustable along the table 136, 137.

This unit comprises a frame structure 175 which is equipped with crossbearings 176 in which two shafts 177 are rotatably mounted in parallel relation transversely of the line along which the sheets are fed. Each shaft is equipped with a sprocket 178 at each end thereof, and an endless chain 179 passes over each longitudinally aligned pair of sprockets in the manner clearly illustrated in Figures 19 and 20 of the drawings. Each chain is partially enclosed by a bottom guide 180 and two end guides 181 all secured to the frame structure 175. A driver sprocket 182 is mounted on the advance shaft 177 and is driven through the medium of a chain 183 which passes over the sprocket 184 secured upon the main shaft 147 and over an idler sprocket 185 mounted on the free end of an adjuster arm 186 which is swingably, adjustably mounted, as at 187, on the frame structure 135. By adjusting the arm 186 the chain 183 can be properly conditioned regardless of the position in which the reciprocatory feeder unit is mounted.

It will be observed by reference to Figure 19 of the drawings that the frame structure 175 includes arms 188 which extend from the four corners thereof, and each longitudinally aligned pair of these arms has secured thereto a guide rail 189. The rails 189 are disposed in laterally spaced parallel relation and serve as slide guides for the reciprocable slide blocks 173 which are slidably mounted thereon in the manner clearly illustrated in Figures 19 and 20. Each block 173 is equipped with a vertical slot or guideway 190 in which a block 191 is slidably mounted, each said block being apertured to receive a driving pin 192 projecting laterally from the respective chain 179.

It will be obvious from the foregoing description that as the chains 179 are continuously driven by the chain 183, the pin and block connection 192, 191 between each chain and the respective slide block 173 will impart straight line reciprocation to the respective block 173 so that the feed fingers 170 will be given straight line reciprocation, the blocks 191 being disposed in the upper ends of the grooves 190 during the forward stroke of the fingers and in the lower end of this slot during retraction of the fingers, moving upwardly or downwardy in said slots as the driving pin passes around the sprockets 178 at one end or the other of the unit.

In order to adjustably mount the reciprocatory feeder unit, T-head bolts 193 are mounted in and extend upwardy through apertures 194 provided in the frame structure 175. The T-heads of the bolts fit in longitudinal T-slots 195 provided beneath the table extension 137 in the manner clearly illustrated in Figure 3 of the drawings. A bracket 196 is secured to one of the frame arms 188 and is equipped with a threaded bore for receiving an adjuster screw 197 having bearing and being held captive as at 198 on the table extension 197 and equipped with a turning crank 199 by manipulation of which the position of the reciprocatory feeder unit can be altered at will.

It will be observed by reference to Figure 23 of the drawings that the sprocket 184 from which the reciprocatory feeder devices are operated is secured to the main cam shaft 147 through a releasable clamping means so that the sprocket can be released and permitted to move with the chain which it drives independently of the shaft 147 so as to facilitate adjustment of the position of the feeder fingers 170. This is true also of the mounting of the sprockets 146 which drive the main feed chain 145 of the second operation trimming unit so as to enable adjustment of the position of the feeding lug equipment on this chain, and it will also be observed by reference to Figure 4 of the drawings that a similar adjustable mounting of the sprockets 14 on the driving shaft 15 is provided so that the position of the feeding lug equipment on the feed chains 13 on the first operation trimming unit can be adjusted.

The reciprocatory feeder fingers 170 cooperate with two laterally spaced rectifier fingers 200 which are adjustably mounted on individually removable carriers 201. See Figures 1a, 21 and 22.

Each of the carriers 201 includes a single upstanding lug 202 at its advance end and two spaced lugs 203 which are spaced from each other and also from the lug 202. In the space between each pair of lugs 203 there is mounted a captive nut 204, and all of the lugs 202 and 203 of each carrier are equipped with aligned, non-threaded bores 205 for freely rotatably receiving an adjuster screw which is formed to include a finely threaded reduced diameter portion 206 and a larger main body portion 207 which is more coarsely threaded. The finely threaded portion of the screw is rotatable in a threaded bore 208 in the captive nut 204, and the coarsely threaded portion 207 of the screw is rotatable in a threaded bore 209 formed in the respective rectifier finger 200. A compression spring 210 is coiled about each screw between the respective finger 200 and the adjacent lug 203, and a jam nut 211 is mounted on each screw in advance of the respective lug 202.

It will be obvious that when the jam nut is backed off, rotation of the particular screw will cause it to turn in the captive nut 204 and also in the respective rectifier finger 200. This rotation of the screw will impart longitudinal movement to the screw and also to the finger 200, and the compound effect of the finer and coarser threads provides for a very accurate and sensitive adjustment of the rectifier fingers. After an adjustment has been thus made, the respective nut 211 can be tightened to set the adjustment. The compression springs serve to take up any play which might be present in the threadable connections and assure accurate positioning of the advance edges of the sheets by the rectifier fingers.

It will be observed by reference to Figure 22 that each rectifier finger 200 includes an abutment wall 212 against which the advance edges of the successively presented sheets abut, and a shelf portion 213 on which said sheet edge portions rest.

Each of the carriers 201 is removably secured, as at 214, on the advance end of a link 215 which is pivotally connected at its advance end to a generally vertically disposed lifting and lowering link 216, and at its rear end to a generally vertically disposed finger advancing and retracting crank arm 217. The two crank arms 217 are secured to a rock shaft 218 which is rockably mounted in frame bearings 219 and has an actuator crank 220 fixed thereon. The actuator crank 220 is equipped at its free end with a roller 221 which engages in the groove 222 in an actuator cam 223 mounted on the main cam shaft 147. At its upper end, each crank arm 217 is connected, as at 224, with a retractile spring 225, the spring being anchored, through a turnbuckle connection 226 at the rear end of the table extension 137. The spring equipments 225 yieldably hold the roller 221 against the active surface in the cam groove 222, and, by thus eliminating lost motion, assure accurate sheet edge rectifying engagement by the fingers 200. It will be obvious that as the crank arms 217 are rocked back and forth, they will impart advancing and retracting movements to the carriers 201 and the rectifier fingers 200 supported thereon.

Each link 216 is pivotally connected at its lower end, as at 227, with a triangularly shaped actuator 228 fixed on a rock shaft 229 which is rockably supported, as at 230, on the unit frame structure 135. Each actuator 228 is equipped with a roller 231 which engages the peripheral surface of a cam 232 rotatable with the main cam shaft 147. A crank 233 secured upon the rock shaft 229 and connected with the anchored spring 234 serves to yieldably hold the actuator rollers 231 in engagement with the cams 232. It will be observed by reference to Figures 21 and 23 of the drawings that each cam 232 includes a hump 235 which imparts lifting and lowering movement to the respective actuator 228 and the link 216 connected therewith.

The combination of the advancing and retracting movements imparted to the rectifier fingers by the crank arms 217, and the lifting and lowering movements imparted thereto by the actuators 228 and links 216, bring about a 4-motion feed movement of the rectifier fingers. These parts are so timed that as each sheet is moved forwardly by the reciprocatory feeder fingers 170, said fingers yieldably press the advance edge of the sheet against the rectifier fingers 200 so as to present said edge in exact parallelism with the axes of the cutter shafts toward which the sheet is being fed. The rectifier fingers move forwardly with the sheet, with the fingers 170 still yieldably holding the sheet against the rectifier fingers, until the advance edge of the sheet engages with and is gripped by the cutter disks and the feed rolls. The cam groove 222 is so formed that it imparts an accelerated forward movement to the rectifier fingers 200 after the advance edge of the sheet has been engaged by the cutter disks and feed rolls and has passed a short distance beyond the cutter shaft centers so that the fingers 200 move forwardly away from said advance sheet edge, and at this time the cams 232 act to lower the fingers 200 so that the sheet can thereafter feed over said fingers and the fingers can be returned by rearward movement of the arms 217 into position for intercepting and rectifying the next sheet.

*Second operation trimming unit gage equipment*

The gage equipment on the second operation trimming unit includes a laterally reciprocable gage block 236 at each side of the unit and slidable in slide guides 237 mounted on the unit table. As in the case of the first operation trimming unit gage equipments, these slide blocks are equipped with depending arms and are link-connected with the upper ends of actuator levers 238 which are pivotally supported intermediately of their ends, as at 239, on the unit frame 135. Each lever is equipped with a roller 240 at its lower end which is spring urged, as in the case of the first described gage equipments, against a cam 241. In one instance, the cam 241 is removably attached to a disk 242 mounted on the main cam shaft 147, and in the other instance the cam is mounted directly on the grooved cam 223 hereinbefore referred to.

The second operation gages per se include a single grooved roller 243 disposed at the right hand side of the unit frame and removably and longitudinally adjustably mounted, as at 244, on a carrier 245 which is laterally adjustably secured, as at 246, on the right hand slide block 236. At the other or left hand side of the unit a single grooved gage roller 247 is yieldably mounted so as to be displaceable by oversized sheets in the same general manner previously described.

The roller 247 is mounted on the free end of a lever 248 which is pivoted at 249 on a block 250. The block 250 is longitudinally-adjustably and removably secured, as at 251, on a carrier 252 which is in turn laterally-adjustably secured, as at 253, on the left hand slide block 236. The lever 248 is extended beyond its pivot and equipped with a lock shoe 254 having a beveled groove 255 therein. See Figures 15, 16 and 17. Engageable in the groove 255 is a wedge beveled shoe 256 which is fixed to the end of a lock member 257 pivotally supported on a pin 258 secured in the block 250. It will be observed by reference to Figure 17 of the drawings that the groove engaging surface of the shoe 256 is disposed eccentrically with respect to the pivotal mounting and that the portion 259 of the pin 258 about which the lock member pivots is eccentrically disposed with respect to the axis of the pin so that by adjustment of the pin about its axis the spaced relation of the lock shoe 254 and the lock member 257 can be varied. An apertured lug 260 extends from the lock member 257 and has connected thereto a retractile spring 261 which is anchored, as at 262, on the block 250. The lever extension also is equipped with an apertured lug 263 with which is connected a retractile spring 264 anchored, as at 265, to the block 250. The spring 264 yieldably urges the roller 247 toward the sheet feedway. The relation of the eccentric wedge 256 in the groove 255 is such that whenever the roller 247 is displaced laterally by an oversized sheet, the lock member 257 will be swung inwardly about its pivot against the tension of the spring 261 and will serve to lock the roller in its displaced position in the same manner as in the case of the yieldable gaging equipment employed on the first operation trimming unit. This locking of the displaced roller will be released only when the locked member 257 is displaced inwardly to release its locking engagement in the groove 255.

In order to provide for the releasing of this lock upon each retraction of the respective slide block 236 following a displacement of a roller by an oversized sheet, the lock member is also equipped with a release lug extension 266 which is engageable upon retraction of the block 236 with a release head 267 laterally-adjustably secured, as at 268, on the unit table. See Figures 16 and 17. Engagement of the release lug 266 with the release head 267 will swing the lock member 257 about its pivotal mounting in a direction for releasing the locking engagement of the shoe 256 in the groove 255 and permitting the roller 257 to return to its normal position.

As in the case of the first operation trimming unit, the second unit is completed by burring rollers 269 accompanied by intermediate rolls 270. These rolls are mounted and function in the same manner and for the same purpose hereinbefore described in connection with the first operation trimming unit and repetition of the detailed description of these elements is thought to be unnecessary. The rolls are mounted on upper and lower shafts 271 rotatable in bearings provided in the standard portions 272.

A spur gear couple 273 mounted on the cutter shaft 158 causes those shafts to move in unison, and it will be noted that one of these shafts is driven by a sprocket and chain couple 274 with the main shaft 147. An idler gear 275 connects with the cutter shaft gear couple 273 and imparts rotation to the burring roll shafts 271 through the gear couple 276 mounted on shafts 271 and with which said idler gear meshes. See Figures 1, 1a and 2.

*Trimming unit position adjustment*

As has been previously described, one of the trimming operation units is mounted for movement of adjustment relative to the other unit on the common supporting base C so as to enable spacing of the units. In this particular illustration the second operation trimming unit is adjustably mounted on the base C.

The base C is provided with parallel spaced racks 277 and the framing structure 135 of the second operation trimming unit is slidably guided on the base, as at 278. The framing 135 includes bearings 279 for rotatably supporting the adjuster shaft 280 which is equipped with a capstan head 281 apertured to receive a lever 282 through the medium of which turning movement can be imparted to the shaft 280. Gears 283 are secured upon the shaft 280 and mesh with the stationary racks 277 so that when the shaft 280 is turned in one direction or the other the whole second operation trimming unit will be moved in one direction or the other along the base, toward and from the first operation trimming unit.

In order to permit this adjustment of the spaced relation of the units, the main cam shaft 147 mounted on the second operation trimming unit and the spline extension 83 of the drive shaft 81 mounted on the first operation trimming unit have telescopic drive contact or spline connection at 284. By reason of the provision of this equipment, the second operation trimming unit can be moved so as to provide approximately 18" of separation between the first operation trimming unit and the second operation trimming unit without breaking the driving connections between the various mechanisms of the respective units. It will be obvious, of course, that the sprocket and chain drive 131 through which rotation is imparted to the burring and intermediate rolls which serve to deliver the sheets onto the second operation trimming table must be broken, but this is the only drive connection which is disconnected. By thus separating the two units, workmen can provide ample space in which to get in between the units and grind the cutter disks on the first operation trimming unit or make any manipulation or adjustments found desirable in this region.

*Operation*

As each sheet to be trimmed is fed onto the feedway of the first operation trimmer unit table, it is engaged by a conveyor lug on the feeder chain 13 and is moved toward the trimming cutters over the supporting rails 11 and guided by the side guide rails 9. Before the advance edge of the sheet reaches the position of the trimming cutters, the gaging devices are moved inwardly in gaging contact with the lateral edges thereof, the fixedly mounted rollers 91 engaging in longitudinal spaced relation at the right hand side, and the single yieldably mounted roller 101 engaging at the opposite or left hand side intermediately of the rollers 91. This 3-point contact serves to accurately gage the sheet even though one or both edges thereof might be slightly concave or convex. The fixedly mounted rollers 91 are positioned relative to the edge trimming cutters at the right hand side of the unit so that a minimum of waste or scrap will be trimmed from the right hand edge. By yieldably mounting the roller 101 at the left hand side, this roller is permitted to be displaced by oversized sheets, and the scrap removed by the trimming operation at the left hand side of the sheet will vary slightly accordingly as the lateral dimensions of the sheets vary.

The gaging rollers maintain their gaging contact with the lateral edges of the sheet until the sheet engages and passes a slight distance through the trimming cutters 27, 30 and the feed rolls 38, 39 whereupon they are withdrawn from their gaging contact. By thus accurately gaging the sheets until the trimming starts, and then applying no further pressure against the lateral edges of the sheets during cutting, the cutting of straight line parallel side edges is assured.

Each time an oversized sheet engages the yieldably mounted roller 101 and displaces the same during a gaging function, the roller 101 is locked in its displaced position and is released to return to its normal position only when the gage is retracted from its gaging position in the manner hereinbefore described. This locking of the yieldably mounted roller prevents inward projection of the roller by its opposing spring such as would tend to displace the sheet laterally and possibly cause an imperfect edge trimming thereof.

The cams which control the reciprocation of the opposed gaging devices are identical in form but are so timed that the yieldably mounted roll leads slightly both in the initial engagement with the sheet and also in moving out of contact with the sheet. The last mentioned yielding function is important because if the right hand gage rollers 91 were permitted to move away simultaneously with or ahead of the spring pressed gage roller 101, the latter would tend to displace the sheet laterally, said sheet then being unopposed by the rollers 91, this being possible, however, only in instances when the locking devices above referred to might be improperly functioning.

In passing through the feed rolls and cutting devices 38, 39 and 27, 30 the sheets are fed without being marred by the feeding devices and are edge trimmed in a manner for assuring perfect parallel relation of the laterally disposed edges. Because of the provision of the scrap supporting rotors 29, twisting and curling of the scrap is prevented, and the scrap deflectors 66 direct the scrap downwardly into suitable receiving receptacles and away from any possible entanglement with machine parts.

After passing through the edge trimming and feeding devices of the first operation trimming unit, the sheets pass between the burring rolls 132 and the intermediate rolls 133, all edge burrs which may have been formed at the edges of the sheets during the trimming operation being rolled out by the rolls 132.

In passing to and through the edge trimming and feeding devices and the burring and intermediate rolls, the sheets are held against buckling by the holddown guide elements 63, 65 and the intermediate rolls 133, and by reason of the provision of these equipments, it is impossible for the sheet to get even slightly out of plane so as to render inaccurate the perfectly parallel edge trimming.

The sheets having had their lateral edges trimmed and rendered perfectly parallel in the first operation trimming unit are delivered from the rolls 132, 133 onto the feedway of the second operation trimming unit, the right hand edge of the sheet being aligned over and supported by the drop bar 153 in a manner for assuring proper clearance of the chain lug conveying the next preceding sheet. In falling onto the feedway between the side guides 141, the left hand advance corner of the sheet contacts a guard plate 285 disposed over a portion of the rails 143 so as to avoid catching of this corner against said rails and the resultant displacement or misalignment of the sheet. As the sheet comes to rest on the feedway, it is engaged by the next approaching lug on the feeder chain 145 and moved along into position for being picked up by the yieldable reciprocatory feeder fingers 170.

The reciprocatory feeder fingers 170 move slightly faster than does the conveyor lug equipment on the chain 145 and take the sheet away from the previously engaged chain lug and move it toward the sheet rectifying fingers.

As previously described, the yieldable fingers 170 press the advanced, previously trimmed edge of the sheet against the laterally spaced rectifying fingers 200, and with the advanced and trailing, previously trimmed edges of the sheet gripped between these four fingers 200, 200 and 170, 170 said fingers move forwardly in unison to present the advance edge of the sheet in exact parallelism to the axes of the cutter shafts.

Prior to contact of the advance sheet edge with the trimming cutters and feeding rolls, the single, opposed gaging rollers 243 and 247 move into gaging contact with the lateral edges of the sheet for accurately gaging the same with relation to the trimming cutters, the relation being similar to that previously described in connection with the first operation trimming unit. Except for the fact that single rollers are opposed in this second operation gaging equipment the gaging function is the same with respect to the fixed mounting of the roller at the right hand side and the yieldable mounting and the locking and releasing of the gaging roller at the left hand side as in the previously described or first operation trimming unit and need not be elaborated upon at this point.

While the side gages 243 and 247 are in engagement with the lateral edges of the sheet and the sheet is still moving forwardly, the initial rectifying contact with the rectifier fingers 200 above referred to is effected. The rectifier fingers move forwardly with the sheet and maintain contact until the sheet has passed a slight distance beyond the centers of the trimming cutter shafts. At this time the side guides are retracted out of contact with the sheet edges, the yieldably mounted rollers 247 leading in the manner previously described, the reciprocatory feeder fingers 170 move out of contact with the trailing edge of the sheet, and the forward movement of the rectifier fingers 200 is accelerated and these fingers are moved downwardly so as to permit movement of the sheet thereover and are then retracted to move up in front of and intercept and rectify the next feed sheet.

The feeding and edge trimming function, the scrap supporting and diverting function, and the burring of the edges of the trimmed sheet, all are the same as like functions described in connection with the first operation trimming unit, and these functions need not be again described in detail at this point.

It is to be understood also that while moving along over the rails 143, from the point of the drop bar 53 on to the burring rolls, the sheets are held against buckling by the holddown members 166 and 165, the guide members 168 and the rolls disposed intermediately of the burring rolls for the purpose previously described.

In Figure 27 of the drawings is illustrated a modified construction and arrangement of feed roll and edge trimming cutter equipments. In this modified arrangement the upper and lower shafts 285 and 286 are shown as supported in parallel relation in bearing equipment somewhat diagrammatically illustrated at 287. Near its ends, the lower shaft 286 carries the lower trimming cutter disks 288 and the cooperating slightly smaller diameter scrap supporting rotors mounted and arranged therein in the manner previously described, and the lower feed rolls 289 are mounted on this shaft in spaced relation intermediately of said cutter disks in the same manner as previously described. It will be observed that in this form of the invention, however, the feed rolls 289 are equipped with central clearances 290, and by reason of the provision of these clearances, a lesser tendency to mark feeding sheets by roll contact is experienced, and yet a pressure contact is provided which will assure efficient and true feeding of the sheets. The lower rolls 289 may be adjustably secured on the shaft 286 through the medium of locking plug and screw equipments respectively designated 290 and 291.

Each of the lower feed rolls 289 is opposed by an upper feed roll mounted on the upper shaft 285, and each of these upper feed roll equipments includes a hub or center portion 292 which is adjustably secured to the shaft 285 by a locking plug 293 pressed against the shaft by a securing bolt 294 having an eccentric portion 295 engaged with the plug, and a laterally projected non-circular turning head 296. A rubber ring 297 surrounds the hub 292 and floatably mounts the feeder ring 298 which includes an inwardly extended flange 299 at one end and overlapping the adjacent end of the hub, and has a keeper ring or flange 300 removably secured as at 301 at its other end in position for overlapping the other or adjacent end of said hub. Each floatably mounted feeder ring 298 is opposed by spaced, spring pressed pressure rolls 302 supported as at 303 on the cross bar 304, and since these pressure applying or hold down equipments are constructed and function in the same manner hereinbefore described in connection with Figures 6 and 7, further detailed description thereof is deemed unnecessary at this point.

In the modified edge trimming equipment shown in Figure 27 there is included a hub 305 which is secured to the shaft 285, and a cutter disk 306 secured to said hub in position for overlapping in shearing relation with the outer edge portion of the respective beforementioned cutter disk 288. A solid stripper or presser ring 307 is floatably mounted between each upper cutter disk 306 and a keeper flange 308 secured to the respective hub 305, in position for overlying and opposing the respective lower cutter disk 288. Each of these rings 307 is opposed by spaced, spring pressed pressure rolls 308 which are supported in the same manner as are the pressure rolls 302 previously referred to, and thus the rings 307 are held down just as the upper feeder rolls rings 298 are.

It is of course to be understood that the details of structure and arrangement of parts may be variously changed and modified without departing from the spirit and scope of the invention.

I claim:

1. In a sheet edge trimming machine, a first operation edge trimming unit, a second operation edge trimming unit, a base common to both units, and cooperating rack and gear connections mounted on the base and one of the units and operable to impart movement to said one unit relative to the other unit for adjusting the unit position relation.

2. In a sheet edge trimming machine, a first operation edge trimming unit, a second operation edge trimming unit, a base common to both units, means for moving one unit relative to the other unit to provide a space intervening said units, sheet edge trimming equipment on each unit, trimming equipment actuating means on each unit, a power source, driving connections between the power source and said actuating means and including extensible parts permitting adjustment of the unit position relation without breaking the driving connections, and a set of trimmed sheet edge burring rolls cooperating with the edge trimming equipment of each unit, the roll set cooperating with the first operation trimming equipment being mounted on the second operation unit so as to provide a working space between said roll set and said first operation trimming equipment when the units are adjusted in spaced apart relation.

3. An edge trimming machine structure as defined in claim 2 in which each unit includes a longitudinal feedway leading to the respective edge trimming equipment, the feedways on the units being disposed in right angular relation, and side guides defining each feedway, the guide on the second operation unit nearest the first operation unit constituting a part of a mounting for the burring roll set cooperating with the first operation trimming equipment.

4. In a sheet edge trimming machine, a first operation edge trimming unit having a longitudinal sheet guiding feedway thereon, a second operation edge trimming unit having a longitudinal sheet guiding feedway thereon disposed in a right angular relation to the first mentioned feedway and in position to receive partially trimmed sheets therefrom, sheet edge trimming equipment on the first operation unit, sheet edge trimming equipment on the second operation unit, means for feeding sheets over the first operation unit feedway and onto the other feedway, means for feeding sheets over the second operation feedway, a set of laterally reciprocable gages engageable with the sheets while moving to the first operation trimming equipment, a set of laterally reciprocable gages engageable with the sheets while moving to the second operation trimming equipment, each said gage set including a fixedly mounted gage element and an opposing yieldably mounted gage element, and means for reciprocating the gage sets timed to cause each yieldably mounted gage element to move out of contact with a sheet before the opposing fixedly mounted gage element moves out of contact therewith.

5. A sheet edge trimming machine structure as defined in claim 4 in which the gage set reciprocating means also is timed to move both gage elements of each set out of contact with a sheet just after that sheet has been engaged and is being trimmed by the respective edge trimming equipment.

6. A sheet edge trimming machine structure as defined in claim 4 in which the gage set reciprocating means also is timed to move both gage elements of each set out of contact with a sheet just after that sheet has been engaged and is being trimmed by the respective edge trimming equipment, and in which means is provided for holding each sheet against buckling out of plane while it is being gaged and edge trimmed.

7. In a sheet edge trimming machine, a first operation edge trimming unit having a longitudinal sheet guiding feedway thereon, a second operation edge trimming unit having a longitudinal sheet guiding feedway thereon disposed in a right angular relation to the first mentioned feedway and in position to receive partially trimmed sheets therefrom, sheet edge trimming equipment on the first operation unit, sheet edge trimming equipment on the second operation unit, means for feeding sheets over the first operation unit feedway and onto the other feedway, means for feeding sheets over the second operation feedway, a set of laterally reciprocable gages engageable with the sheets while moving to the first operation trimming equipment, a set of laterally reciprocable gages engageable with the sheets while moving to the second operation trimming equipment, the first operation gage set including two longitudinally spaced gage elements engageable with sheet edges at one side of the associated feedway and a single gage element engageable with sheet edges at the other side of said associated feedway intermediately of said two gage elements, and means for reciprocating said gage sets.

8. A sheet edge trimming machine structure as defined in claim 7 in which the single gage element which intermediately opposes the two longitudinally spaced gage elements is yieldably mounted so as to be displaceable by an oversized sheet.

9. A sheet edge trimming machine structure as defined in claim 7 in which the single gage element which intermediately opposes the two longitudinally spaced gage elements is yieldably mounted so as to be displaceable by an oversized sheet, and in which means is provided for locking the yieldably mounted element in its displaced position each time it is displaced, and means for releasing the locking means and restoring the yieldably mounted gage element to normal as it is retracted out of contact with the sheet which displaced it.

10. A sheet edge trimming machine structure as defined in claim 7 in which the single gage element which intermediately opposes the two longitudinally spaced gage elements is yieldably mounted so as to be displaceable by an oversized sheet, and in which the gage set reciprocating means is timed to withdraw the yieldably mounted gage element out of sheet contact before the opposing two gage elements are withdrawn from contact with the same sheet.

11. In a sheet edge trimming machine, a first operation edge trimming unit having a longitudinal sheet guiding feedway thereon, a second operation edge trimming unit having a longitudinal sheet guiding feedway thereon disposed in a right angular relation to the first mentioned feedway and in position to receive partially trimmed sheets therefrom, sheet edge trimming equipment on the first operation unit, sheet edge trimming equipment on the second operation unit, means for feeding sheets over the first operation unit feedway and onto the other feedway, means for feeding sheets over the second operation feedway, a set of laterally reciprocable gages engageable with the sheets while moving to the first operation trimming equipment, and a set of laterally reciprocable gages engageable with the sheets while moving to the second operation trimming equipment, said last mentioned feeding means including four feeding and rectifying elements yieldably engaging a sheet at four points in two pairs one pair engaging in laterally spaced relation at the advance previously trimmed edge of the sheet and the other pair engaging in laterally spaced relation at the trailing previously trimmed edge of the sheet.

12. A sheet edge trimming machine structure as defined in claim 11 in which is included means for actuating the four feeding and rectifying elements in timed relation with the pair of elements engaging the advance edge of the sheet moving forwardly away from and beneath the path of movement of the advance sheet edge just after it has engaged the respective edge trimming equipment.

13. In a sheet edge trimming machine, a first operation edge trimming unit having a longitudinal sheet guiding feedway thereon, a second operation edge trimming unit having a longitudinal sheet guiding feedway thereon disposed in a right angular relation to the first mentioned feedway and in position to receive partially trimmed sheets therefrom, sheet edge trimming equipment on the first operation unit, sheet edge trimming equipment on the second operation unit, means for feeding sheets over the first operation unit feedway and onto the other feedway, means for feeding sheets over the second operation feedway, a set of laterally reciprocable gages engageable with the sheets while moving to the first operation trimming equipment, a set of laterally reciprocable gages engageable with the sheets while moving to the second operation trimming equipment, and a set of opposed burring rolls associated with each edge trimming equipment and disposed to engage and remove burrs from sheet edges trimmed by said edge trimming equipment.

14. A sheet edge trimming machine structure as defined in claim 13 in which each set of burring rolls includes a plurality of intermediately placed opposing rolls engageable above and below sheets passing through the burring rolls and which are spaced apart a distance slightly greater than are the burring rolls.

15. In a sheet edge trimming machine, a first operation edge trimming unit having a longitudinal sheet guiding feedway thereon, a second operation edge trimming unit having a longitudinal sheet guiding feedway thereon disposed in a right angular relation to the first mentioned feedway and in position to receive partially trimmed sheets therefrom, sheet edge trimming equipment on the first operation unit, sheet edge trimming equipment on the second operation unit, means for feeding sheets over the first operation unit feedway and onto the other feedway, means for feeding sheets over the second operation feedway, a set of laterally reciprocable gages engageable with the sheets while moving to the first operation trimming equipment, a set of laterally reciprocable gages engageable with the sheets while moving to the second operation trimming equipment, each said gage set including a fixedly mounted gage element and an opposing yieldably mounted gage element displaceable by oversized sheets, means for locking each yieldably mounted gage element in its displaced position each time it is displaced, and means for releasing the locking means and restoring the respective yieldably mounted gage element to normal as it is retracted out of contact with the sheet which displaced it.

16. In a sheet edge trimming machine, a first operation edge trimming unit having a longitudinal sheet guiding feedway thereon, a second operation edge trimming unit having a longitudinal sheet guiding feedway thereon disposed in a right angular relation to the first mentioned feedway and in position to receive partially trimmed sheets therefrom, sheet edge trimming equipment on the first operation unit, sheet edge trimming equipment on the second operation unit, means for feeding sheets over the first operation unit feedway and onto the other feedway, means for feeding sheets over the second operation feedway, a set of laterally reciprocable gages engageable with the sheets while moving to the first operation trimming equipment, a set of laterally reciprocable gages engageable with the sheets while moving to the second operation trimming equipment, said last mentioned sheet feeding means including an endless chain having upstanding sheet engaging feed lugs, longitudinally disposed and laterally spaced slide rails for supporting sheets fed by the chain lugs, a drop bar for controlling the dropping of sheets onto the slide rails so as to avoid contact with chain lugs then moving sheets along, and a guard plate over a portion of said slide rails in position for engaging corner portions of sheets dropping onto the slide rails and preventing catching thereof against said rails.

17. In a machine of the character described, a sheet edge trimming unit comprising a sheet guiding feedway, a sheet edge trimming equipment, means for feeding sheets to said trimming equipment, a set of laterally reciprocable gages engageable with the sheets while moving to the trimming equipment and including a fixedly mounted gage element and an opposing yieldably mounted gage element, and means for reciprocating the gage elements in timed relation to cause the yieldably mounted element to move out of contact with a sheet before the opposing fixedly mounted gage element moves out of contact therewith.

18. A structure as defined in claim 17 in which the gage element reciprocating means also is timed to move both gage elements out of contact with a sheet just after that sheet has been engaged and is being trimmed by the trimming equipment.

19. In a machine of the character described, a sheet edge trimming unit comprising a sheet guiding feedway, a sheet edge trimming equipment, means for feeding sheets to said trimming equipment, a set of laterally reciprocable gages engageable with the sheets while moving to the trimming equipment and including a fixedly mounted gage element and an opposing yieldably mounted gage element, means for reciprocating the gage elements, means for locking the yieldably mounted gage element in its displaced position each time it is displaced by contact with an oversized sheet, and means for releasing the locking means and restoring the yieldably mounted gage element to normal as it is retracted out of contact with the sheet which displaced it.

20. In a machine of the character described, a sheet edge trimming unit comprising a sheet guiding feedway, a sheet edge trimming equipment, means for feeding sheets to said trimming equipment, a set of laterally reciprocable gages engageable with the sheets while moving to the trimming equipment and including two longitudinally spaced gage elements engageable with sheet edges at one side of the feedway and a single gage element engageable with sheet edges at the other side of the feedway intermediately of said two gage elements, and means for reciprocating the gage elements into and out of contact with sheet edges.

21. A sheet edge trimming machine structure as defined in claim 20 in which the single gage element which intermediately opposes the two longitudinally spaced gage elements is yieldably mounted so as to be displaceable by an oversized sheet.

22. A sheet edge trimming machine structure as defined in claim 20 in which the single gage element which intermediately opposes the two longitudinally spaced gage elements is yieldably mounted so as to be displaceable by an oversized sheet, and in which means is provided for locking the yieldably mounted element in its displaced position each time it is displaced, and means for releasing the locking means and restoring the yieldably mounted gage element to normal as it is retracted out of contact with the sheet which displaced it.

23. A sheet edge trimming machine structure as defined in claim 20 in which the single gage element which intermediately opposes the two longitudinally spaced gage elements is yieldably mounted so as to be displaceable by an oversized sheet, and in which the gage set reciprocating means is timed to withdraw the yieldably mounted gage element out of sheet contact before the opposing two gage elements are withdrawn from contact with the same sheet.

24. In a machine of the character described, a sheet edge trimming unit comprising a sheet guiding feedway, a sheet edge trimming equipment, means for feeding sheets to said trimming equipment, a set of laterally reciprocable gages engageable with the sheets while moving to the trimming equipment and including two longitudinally spaced gage elements engageable with sheet edges at one side of the feedway and a single gage element engageable with sheet edges at the other side of the feedway intermediately of said two gage elements, and means for reciprocating the gage elements into and out of contact with sheet edges so timed that both gage elements are moved out of contact with the sheet edges just after the sheet has engaged and is being edge trimmed by the trimming equipment.

25. In a machine of the character described, a sheet edge trimming unit comprising a sheet guiding feedway, a sheet edge trimming equipment, means for feeding sheets to said trimming equipment, a set of laterally reciprocable gages engageable with the sheets while moving to the trimming equipment, said trimming equipment including upper and lower shafts between which the sheets are fed and engaging rotary shearing cutters mounted on said shafts, each upper cutter being disposed laterally outwardly of the engaging lower cutter, and a floatably mounted presser rotor carried by each upper cutter and overlying and opposing the engaging lower cutter.

26. In a machine of the character described, a sheet edge trimming unit comprising a sheet guiding feedway, a sheet edge trimming equipment, means for feeding sheets to said trimming equipment, a set of laterally reciprocable gages engageable with the sheets while moving to the trimming equipment, said trimming equipment including upper and lower shafts between which the sheets are fed and engaging rotary shearing cutters mounted on said shafts, each upper cutter being disposed laterally outwardly of the engaging lower cutter, a scrap supporting rotor carried by the lower shaft and underlying each upper cutter, and scrap diverting means aligned with the scrap supported by each said supporting rotor.

27. In a machine of the character described, a sheet edge trimming unit comprising a sheet guiding feedway, a sheet edge trimming equipment, means for feeding sheets to said trimming equipment, a set of laterally reciprocable gages engageable with the sheets while moving to the trimming equipment, said trimming equipment including upper and lower shafts between which the sheets are fed and engaging rotary shearing cutters mounted on said shafts, a plurality of feed rolls fixedly mounted on one said shaft between the cutters thereon, and a complementary plurality of floatably mounted feed rolls on the other shaft and opposing the fixedly mounted feed rolls.

28. In a machine of the character described, a sheet edge trimming unit comprising a sheet guiding feedway, a sheet edge trimming equipment, means for feeding sheets to said trimming equipment, a set of laterally reciprocable gages engageable with the sheets while moving to the trimming equipment, said trimming equipment including upper and lower shafts between which the sheets are fed and engaging rotary shearing cutters mounted on said shafts, a plurality of feed rolls fixedly mounted on one said shaft between the cutters thereon, a complementary plurality of floatably mounted feed rolls on the other shaft and opposing the fixedly mounted feed rolls, and means for applying pressure to the floatably mounted feed rolls only when sheets are passing therethrough.

29. In a machine of the character described, a sheet edge trimming unit comprising a sheet guiding feedway, a sheet edge trimming equipment, means for feeding sheets to said trimming equipment, a set of laterally reciprocable gages engageable with the sheets while moving to the trimming equipment, said trimming equipment including upper and lower shafts between which the sheets are fed and engaging rotary shearing cutters mounted on said shafts, a plurality of feed rolls fixedly mounted on one said shaft between the cutters thereon, a complementary plurality of floatably mounted feed rolls on the other shaft and opposing the fixedly mounted feed rolls, and a set of opposed burring rolls associated with the cutters and disposed to engage and remove burrs from sheet edges trimmed by said cutters.

30. In a machine of the character described, a sheet edge trimming unit comprising a sheet guiding feedway, a sheet edge trimming equipment, means for feeding sheets to said trimming equipment, a set of laterally reciprocable gages engageable with the sheets while moving to the trimming equipment, said trimming equipment including upper and lower shafts between which the sheets are fed and engaging rotary shearing cutters mounted on said shafts, a plurality of feed rolls fixedly mounted on one said shaft between the cutters thereon, a complementary plurality of floatably mounted feed rolls on the other shaft and opposing the fixedly mounted feed rolls, a set of opposed burring rolls associated with the cutters and disposed to engage and remove burrs from sheet edges trimmed by said cutters, and means for holding sheets against buckling out of plane while being gaged and moving to and through said cutters and burring rolls.

31. In a machine of the character described, a sheet edge feeding and trimming unit comprising, upper and lower shafts between which sheets to be trimmed are received, engaging rotary shearing cutters mounted on said shafts, a plurality of feed rolls mounted on one said shaft between the cutters thereon, and a complementary plurality of floatably mounted feed rolls on the other shaft and opposing the fixedly mounted feed rolls, each said roll including a core fixed on the roll carrying shaft and a core surrounding and sheet engaging ring, flange means preventing displacement of the ring from the core in the direction of the axis of the ring, and anti-friction bearings interposed between said flange means.

32. In a machine of the character described, a sheet edge feeding and trimming unit comprising, upper and lower shafts between which sheets to be trimmed are received, engaging rotary shearing cutters mounted on said shaft, each upper cutter being disposed laterally outwardly of the engaging lower cutter, opposing feed rolls mounted on the shafts between the cutters thereon, a scrap supporting rotor carried by the lower shaft and underlying each upper cutter, and scrap diverting means aligned with the scrap supported by each said supporting rotor.

33. In a machine of the character described, a sheet edge feeding and trimming unit comprising, upper and lower shafts between which sheets to be trimmed are received, engaging rotary shearing cutters mounted on said shaft, a plurality of feed rolls fixedly mounted on one said shaft between the cutters thereon, a complementary plurality of floatably mounted feed rolls on the other shaft and opposing the fixedly mounted feed rolls, and means for applying pressure to the floatably mounted feed rolls only when sheets are passing therethrough.

34. In a machine of the character described, a sheet edge feeding and trimming unit comprising, upper and lower shafts between which sheets to be trimmed are received, engaging rotary shearing cutters mounted on said shaft, a plurality of feed rolls fixedly mounted on one said shaft between the cutters thereon, a complementary plurality of floatably mounted feed rolls on the other shaft and opposing the fixedly mounted feed rolls, and means for applying pressure to the floatably mounted feed rolls only when sheets are passing therethrough, said last named means comprising a pair of presser rollers opposed to each floatably mounted roll and spaced apart to engage it like distances in advance of and beyond its center, a stem carrying each pair of presser rolls, stop means limiting movement of each stem toward the associated floatably mounted roll just short of pressure contact of the presser rollers with the floatably mounted roll when no sheet is passing through, and spring means for applying pressure to the stem and presser rolls to resist displacement thereof by a passing sheet engaging the floatably mounted rolls and forcing them against the presser rolls.

35. In a machine of the character described, a sheet edge trimming unit comprising a sheet guiding feedway, a sheet edge trimming equipment, means for feeding sheets to said trimming equipment, a set of laterally reciprocable gages engageable with the sheets while moving to the trimming equipment and including a fixedly mounted gage element and an opposing yieldably mounted gage element, means for reciprocating the gage elements, means for locking the yieldably mounted gage element in its displaced position each time it is displaced by contact with an oversized sheet, and means for releasing the locking means and restoring the yieldably mounted gage element to normal as it is retracted out of contact with the sheet which displaced it, said locking means comprising a locking element movable with the yieldably mounted gage element independent of its mounting, a pivotally mounted lock member, said locking element and said lock including interengaging eccentrically disposed portions relatively movable freely to permit movement of displacement of the yieldably mounted gage element but automatically engageable in wedging contact to prevent return movement of said gage element following each displacement, and said releasing means comprising a stationary abutment contacted by the lock member upon each retraction of the yieldably mounted gage element to break said wedging contact.

36. In a machine of the character described, a sheet guiding feedway, upper and lower shafts between which fed sheets are received and having thereon cooperating sheet edge trimming rotors, means for feeding sheets to the trimming rotors, and rectifying means for assuring presentation of advance edges of sheets in true parallelism with the trimming rotor axes, said last named means comprising a pair of laterally spaced rectifier fingers, and means to impart four-motion movements to said fingers always in parallelism with the shaft axes with the fingers moving upwardly to lie in the path of travel of and abut and rectify the advance edge of a sheet before it reaches the trimming rotors, then forwardly with the sheet until the advance edge thereof is engaged with and being trimmed by the trimming rotors, then downwardly below the path of travel of the sheets and back to their starting point.

37. A machine structure as defined in claim 36 in which is included means for yieldably holding each sheet against the rectifying fingers until after the sheet has engaged the trimming rotors.

38. A machine structure as defined in claim 36 in which is included means for yieldably holding each sheet against the rectifying fingers until after the sheet has engaged the trimming rotors, and in which said movement imparting means includes devices for accelerating the movement of the fingers to cause them to travel faster than the sheet after contact of the sheet with the trimming rotors and while said fingers are moving forwardly and downwardly out of the path of travel of the sheets.

39. A machine structure as defined in claim 36 in which said movement imparting means includes a generally horizontal carrier link for each finger, a generally vertical advancing and retracting arm connected at the trailing end of each link, a rock shaft to which the arms are fixed, means for rocking the rock shaft a lifting and lowering link depending from the advance end of each carrier link, and rotary cam means for imparting lifting and lowering movements to said depending links.

40. A structure as defined in claim 36 in which there is included means for individually adjusting the position of each rectifier finger.

41. A structure as defined in claim 36 in which there is included means for individually adjusting the position of each rectifier finger, each said finger adjustment including an adjuster screw having a threadable connection in the respective finger and a threadable connection in a support on the respective carrier, one said threadable connection being a fine thread and the other a coarser thread, and spring means engaging each finger to take up any free play in the threadable connection therewith.

42. A machine structure as defined in claim 36 in which is included means for yieldably holding each sheet against the rectifying fingers until after the sheet has engaged the trimming rotors and comprising a laterally spaced pair of yieldably mounted feeder fingers and means for imparting reciprocatory movement to the feeder fingers in timed relation to the rectifier fingers.

43. A machine structure as defined in claim 36 in which is included means for yieldably holding each sheet against the rectifying fingers until after the sheet has engaged the trimming rotors and comprising a laterally spaced pair of yieldably mounted feeder fingers and means for imparting reciprocatory movement to the feeder fingers in timed relation to the rectifier fingers, said last named means including a pair of slides carrying the feeder fingers, means for slide guiding the slides, and endless chain means for imparting reciprocatory movement in unison to said slides.

44. A machine structure as defined in claim 36 in which is included means for yieldably holding each sheet against the rectifying fingers until after the sheet has engaged the trimming rotors and comprising a laterally spaced pair of yieldably mounted feeder fingers and means for imparting reciprocatory movement to the feeder fingers in timed relation to the rectifier fingers, said feeder fingers and said reciprocatory movement imparting means together comprising an adjustably mounted unitary structure, and means for adjusting the position of said unitary structure for varying the spaced relation of the feeder fingers and the rectifier fingers.

45. In a machine of the character described, a table whereon is provided a sheet guiding feedway, and reciprocatory feeder means for feeding sheets along said feedway, said feeder comprising a frame, a pair of slide guides disposed in parallel laterally spaced relation on the frame, a slide slidable on each guide and having a feeder finger thereon and a vertical grooveway therein, and endless chain means supported on the frame and having driving pin means projecting therefrom and engaged in said slide grooveways for imparting reciprocatory movement to said slides.

46. In a machine of the character described, a table whereon is provided a sheet guiding feedway, and reciprocatory feeder means for feeding sheets along said feedway, said feeder comprising a frame, a pair of slide guides disposed in parallel laterally spaced relation on the frame, a slide slidable on each guide and having a feeder finger thereon and a vertical grooveway therein, transversely disposed parallel shafts rotatably supported on the frame, two sprockets fixed to each shaft one adjacent each slide guide, an endless chain passing over each two shafts adjacent each slide guide, an apertured block vertically slidable in each grooveway, and a driving pin projecting from each chain into the aperture in the adjacent block so that as each pin travels with the endless chain from which it projects it will impart straight line reciprocatory movement to the adjacent slide and its feeder finger.

47. In a machine of the character described, a table whereon is provided a sheet guiding feedway, and reciprocatory feeder means for feeding sheets along said feedway, said feeder comprising a frame, a pair of slide guides disposed in parallel laterally spaced relation on the frame, a slide slidable on each guide and having a feeder finger thereon and a vertical grooveway therein, and endless chain means supported on the frame and having driving pin means projecting therefrom and engaged in said slide grooveways for imparting reciprocatory movement to said slides, means supporting the frame for movement of adjustment along the table, and captive screw means threadably engaging the frame and effective when turned in one direction or the other to impart movement of adjustment to said frame.

48. In a machine of the character described, sheet edge trimming means comprising, an upper and a lower shaft arranged in parallel relation, an edge trimming cutter disk mounted on each shaft, said disks having their edges overlapped in shearing relation, a presser ring floatably mounted beside one said disk in opposition to the other said disk, and means for yieldably pressing said ring toward the disk which it opposes, and including a pair of presser rollers engaging the periphery of the floatably mounted ring one at each side of the center of said ring.

49. A structure as defined in claim 48 in which said ring pressing means comprises a plunger, a pair of presser rolls carried by the plunger and engageable in spaced relation on said ring, and means yieldably urging the plunger toward the ring.

50. A structure as defined in claim 48 in which said ring pressing means comprises a plunger, a pair of presser rolls carried by the plunger and engageable in spaced relation on said ring, means yieldably urging the plunger toward the ring, and adjustable means for limiting movement of the plunger toward the ring.

51. In a machine of the character described, sheet edge trimming means comprising, an upper and a lower shaft arranged in parallel relation, an edge trimming cutter disk mounted on each shaft, said disks having their edges overlapped in shearing relation, a presser ring floatably mounted beside one said disk in opposition to the other said disk, means for yieldably pressing said ring toward the disk which it opposes, feeder rolls mounted in opposed pairs in spaced relation on said shafts, one feeder roll of each opposed pair including a floatably mounted feeder ring, and means for yieldably pressing each said feeder ring toward the feeder roll which it opposes.

52. A structure as defined in claim 51 in which each said means for yieldably pressing a ring comprises a plunger, a pair of presser rolls carried on the plunger and engageable in spaced relation on the respective ring, and means yieldably urging the plunger toward said respective ring.

53. In a machine of the character described, sheet feeding means comprising, upper and lower shafts arranged in parallel relation, feeder rolls mounted in opposed pairs in spaced relation on said shafts, one feeder roll of each opposed pair including a floatably mounted feeder ring, and means for yieldably pressing each said feeder ring toward the feeder roll which it opposes, the sheet engaging or feeding surface of at least one of each pair of said rolls having a central clearance effective to minimize tendencies of the roll to mark sheets engaged thereby and assure efficient and true feeding of said sheets.

54. In a sheet edge trimming machine, a first operation edge trimming unit having a frame structure and means thereon for feeding sheets-to-be-trimmed longitudinally of said first operation unit and means for trimming the longitudinally travelling edge portions of said sheets, a second operation edge trimming unit having a separate frame structure and means thereon for feeding sheets-to-be-trimmed longitudinally of said second operation unit and at right angles to the direction of feed of the sheets on said first operation unit and means for trimming the longitudinally travelling edge portions of the sheets on said second operation unit, a base common to both unit frame structures, and means for moving one unit frame structure relative to the other unit frame structure to provide a space intervening said units.

55. In a sheet edge trimming machine, a first operation edge trimming unit having a frame structure and means thereon for feeding sheets-to-be-trimmed longitudinally of said first operation unit and means for trimming the longitudinally travelling edge portions of said sheets, a second operation edge trimming unit having a separate frame structure and means thereon for feeding sheets-to-be-trimmed longitudinally of said second operation unit and at right angles to the direction of feed of the sheets on said first operation unit and means for trimming the longitudinally travelling edge portions of the sheets on said second operation unit, a base common to both unit frame structures, and means for moving one unit frame structure relative to the other unit frame structure to provide a space intervening said units, trimming equipment actuating means on each unit, a power source, and driving connections between the power source and said actuating means and including extensible parts permitting adjustment of the unit position relation without breaking the driving connections.

56. In a sheet edge trimming machine, a first operation edge trimming unit having a frame structure and means thereon for feeding sheets-to-be-trimmed longitudinally of said first operation unit and means for trimming the longitudinally travelling edge portions of said sheets, a second operation edge trimming unit having a separate frame structure and means thereon for feeding sheets-to-be-trimmed longitudinally of said second operation unit and at right angles to the direction of feed of the sheets on said first operation unit and means for trimming the longitudinally travelling edge portions of the sheets on said second operation unit, a base common to both unit frame structures, and means for moving one unit frame structure relative to the other unit frame structure to provide a space intervening said units, a motor mounted on one unit, and driving connections between the power source and said actuating means and including a telescopic driving shaft permitting adjustment of the unit position relation without breaking the driving connections.

WALTER G. PLUMB.